(12) United States Patent
Levert et al.

(10) Patent No.: US 12,229,180 B2
(45) Date of Patent: Feb. 18, 2025

(54) ELECTRONIC MEDIA REDACTION SYSTEM INCLUDING PERFORMANCE ANALYTICS

(71) Applicant: MOTOROLA SOLUTIONS, INC., Chicago, IL (US)

(72) Inventors: Chantal Levert, Ottawa (CA); Francois Cregheur, Gatineau (CA); Scott J. Pappas, Lake Zurich, IL (US); Steve Mardakis, Gatineau (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 63 days.

(21) Appl. No.: 18/074,291

(22) Filed: Dec. 2, 2022

(65) Prior Publication Data
US 2024/0184819 A1    Jun. 6, 2024

(51) Int. Cl.
*G06F 16/435* (2019.01)
*G06F 16/438* (2019.01)
*G06F 21/62* (2013.01)

(52) U.S. Cl.
CPC .......... *G06F 16/435* (2019.01); *G06F 16/438* (2019.01); *G06F 21/6254* (2013.01)

(58) Field of Classification Search
None
See application file for complete search history.

(56) References Cited

U.S. PATENT DOCUMENTS

| | | |
|---|---|---|
| 7,966,220 B2 | 6/2011 | Clark |
| 9,413,890 B2 | 8/2016 | McCormack et al. |
| 9,779,386 B2 | 10/2017 | Swierz et al. |
| 10,108,306 B2 | 10/2018 | Khoo et al. |
| 10,158,639 B1* | 12/2018 | Goben ............... H04L 63/10 |
| 10,789,385 B1* | 9/2020 | Jayapalan .......... G06F 16/5866 |
| 11,263,587 B2 | 3/2022 | Masood et al. |
| 2009/0016615 A1* | 1/2009 | Hull .................. G06V 30/414 |
| | | 382/217 |
| 2012/0033892 A1* | 2/2012 | Blenkhorn ......... G06V 30/412 |
| | | 382/218 |
| 2014/0129936 A1* | 5/2014 | Richards ............. G06F 16/248 |
| | | 715/716 |
| 2015/0371172 A1 | 12/2015 | Minter |
| 2016/0260044 A1 | 9/2016 | Sabet et al. |

(Continued)

FOREIGN PATENT DOCUMENTS

| | | |
|---|---|---|
| AU | 2019202398 B2 | 5/2019 |
| EP | 3164805 A1 | 5/2017 |
| WO | WO-2022104484 A1 | 5/2022 |

OTHER PUBLICATIONS

PCT/US2023/081035, Electronic Media Redaction System Including Performance Analytics, filed Nov. 24, 2023.

*Primary Examiner* — Thu N Nguyen
(74) *Attorney, Agent, or Firm* — PERRY + CURRIER, INC.

(57) ABSTRACT

The present specification provides an electronic media redaction system including performance analytics. In an embodiment, a baseline redacted version of a media file is received, and a comparative redacted version of the media file is also received. A comparison is made between the comparative redacted version of the media file and the baseline redacted version of the media file. As a result of the comparison, a performance ranking is determined and a display is controlled to cause the performance ranking to be generated on the display.

19 Claims, 15 Drawing Sheets

(56) References Cited

U.S. PATENT DOCUMENTS

| | | |
|---|---|---|
| 2019/0012381 A1* | 1/2019 | Debique ............ G06F 16/9535 |
| 2020/0074156 A1 | 3/2020 | Janumpally et al. |
| 2020/0175767 A1 | 6/2020 | Stivi et al. |
| 2022/0004274 A1 | 1/2022 | Khoo et al. |
| 2022/0247800 A1 | 8/2022 | Matula et al. |
| 2023/0259555 A1 | 8/2023 | Duraimanickam et al. |

* cited by examiner

ELECTRONIC MEDIA REDACTION SYSTEM INCLUDING PERFORMANCE ANALYTICS

BACKGROUND OF THE INVENTION

Healthy functioning of civil society requires checks against overreach by the state and other powerful interests. Such checks include a balance between protecting the public's right to access information and the individual's right to privacy. The explosion of surveillance technology offers enormous opportunities to capture incidents on electronic media and can have many uses, including assisting the state's functions of law enforcement and public safety. Along with such benefits, risks of abuse are also present. Checks against misuse or overreach can be achieved by requiring reasonable public disclosure of the media capturing the incidents. On the other hand, captured incidents often include private information of individuals that is irrelevant to satisfying the public interest and public disclosure could result in harm to those individuals. Therefore, redaction of private information from such electronic media is required.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
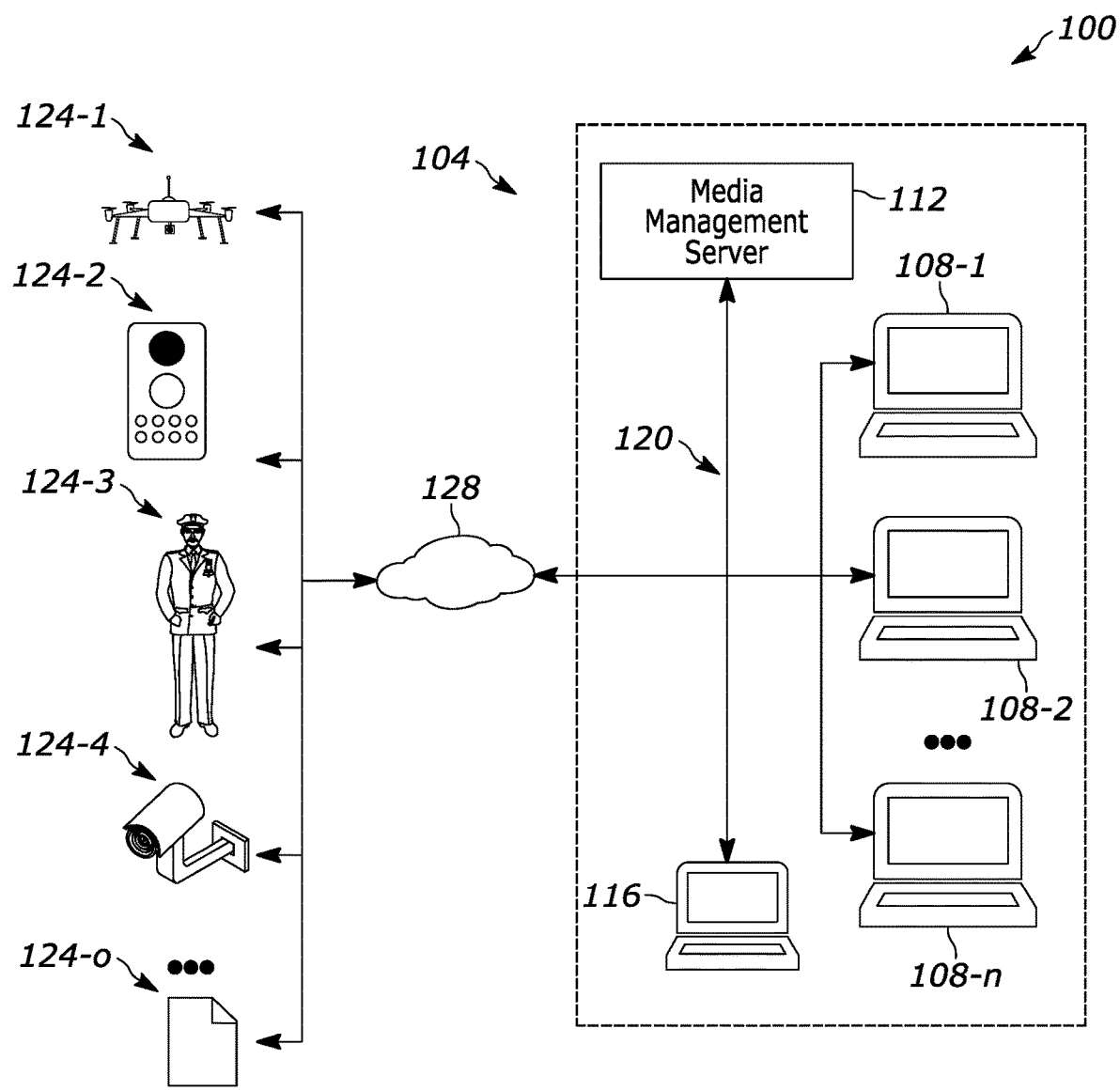
FIG. 1 is a block diagram representing a system for electronic media redaction according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and process components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Public safety agencies frequently receive requests to release copies of electronic media captured from different sources. The format of such electronic media is not particularly limited, and can include video, audio, text and/or combinations thereof. Such requests often originate from the press or other news sources, particularly when the content relates to public safety incidents. Other interested parties may make such requests. However, before such electronic media is released, it is important to redact the private information of individuals whose presence is otherwise irrelevant to the disclosure function. Such private information can include personally identifiable information (PII), such as, by way of non-limiting example, full legal names, social security numbers, facial features, tattoos, license plates, physical location addresses, speech, and/or text. Hereafter, this process may be referred to as "redaction". The context for redaction can arise in other circumstances, such as the Google™ Streetview project whereby PII is removed before making the file publicly available.

Accurate and timely redaction is an enormous challenge. There can be many subjective and contextually specific decisions as to what information should be redacted. Unconscious bias may further confound such decision making. The redaction process should be completed within reasonable and predictable time constraints, as the release of the media in a timely fashion may be necessary to preserve the relevance for public interest. The process is typically manual, however recent technological advancements in the field of neural networks and artificial intelligence have also allowed for increasing use of automation to perform redactions. The consequences of inaccurate redactions can be severe, causing harm to individuals and undermining faith in public safety institutions. The sheer and increasing volume of electronic media and the subsequent redaction process may create significant inefficiencies in the use of technology, wasting valuable processing, memory, and communication resources.

The present specification thus provides a metrics system for monitoring and analyzing media redaction performance comprising: an electronic computing device including a processor configured to: receive a set of performance metrics of a redacted version of a media file of a predefined type; receive a comparative redacted version of the media file of the same type; determine a set of differences between the baseline redacted version and the comparative redacted version; determine a performance ranking based on the set of differences; and, cause the performance ranking to be displayed.

The processor can be further configured to: determine if the performance ranking meets a predetermined threshold; determine a redaction agent account associated with the comparative redacted version; allocate, to the redaction agent account, an unredacted media file; and, display the unredacted media file in a workflow queue associated with the redaction agent account.

The processor can be further configured to: determine if the performance ranking falls below a predetermined threshold; determine a redaction agent account associated with the comparative redacted version; allocate, to the redaction agent account, an unredacted training version of a second media file associated with a second baseline redacted version of the second media file; and, display the unredacted training version in a workflow queue of the redaction agent account for eventual determination of a further performance ranking.

The media file can have content taken from a physical space having an expectation of privacy for individuals and the baseline redacted version has redacted personally identifiable information of the individuals. The media file can be a public safety incident occurring in the physical space.

The performance ranking can be displayed in a different format if the ranking exceeds a predetermined threshold.

The performance ranking can be a level of accuracy between the comparative redacted version and the baseline redacted version.

The performance ranking can be a length of time taken to complete the comparative redacted version in relation to the baseline redacted version or an expected length of time to complete the comparative redacted version.

The performance ranking can show relative performance of a redaction agent account associated with the comparative redacted version in relation to at least one additional redaction agent account or at least one automatically redacted baseline redacted version that each generated different respective comparative redacted versions.

The performance ranking can include individual types of rankings. The individual types of rankings can include at least one of accuracy and duration to complete.

The redaction can be at least one of removal or obfuscation of a portion video image; a removal or obfuscation of a portion of an audio file; and a removal or obfuscation of piece of text.

Another aspect of the present specification provides a process for monitoring and analyzing media redaction performance, comprising:
receiving, at a computer processor, a set of baseline performance metrics for a redacted version of a media file of a predefined type;
receiving, at the computer processor, a comparative redacted version of a media file of same the predefined type;
determining, at the computer processor, a set of differences between the baseline performance metrics and the comparative redacted version;
determining, at the computer processor, a performance ranking based on the set of differences; and, controlling, via the computer processor, a display device connected to the computer processor, to cause the performance ranking to be displayed.

each of the above-mentioned aspects will be discussed in more detail below, starting with example system and device architectures of the system, in which the embodiments may be practiced, followed by an illustration of processing blocks for achieving an improved technical electronic media redaction system including performance analytics.

Example embodiments are herein described with reference to flowchart illustrations and/or block diagrams of processes, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The processes and processes set forth herein need not, in some embodiments, be performed in the exact sequence as shown and likewise various blocks may be performed in parallel rather than in sequence. Accordingly, the elements of processes and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Referring now to FIG. 1, a system for electronic media redaction analytics is indicated generally at 100. The system 100 comprises a command center 104 that can be a commercial or public safety command center such as a police headquarters, fire station, dispatch center, or public safety answering point (PSAP).

The command center 104 comprises one or more workstations 108-1, 108-2 . . . 108-*n*. (Collectively, the workstations 108-1, 108-2 . . . 108-*n* will be referred to as the workstations 108, and generically, as workstation 108. This nomenclature is used elsewhere herein.) In variations, the command center 104 may be the public security office of an amusement park or an office tower, or any media management center in a private corporation that collects surveillance or other information from public spaces. A person of skill in the art will recognize that the dashed lines depicting the box representing command center 104 indicate that, at least in the context of a PSAP, the elements inside the box are typically controlled by a single entity, and/or co-located near to each other. However, this representation is for illustrative purposes as to the context as to how the present embodiments may be implemented, but there is no necessary technical limitation associated with central ownership or control or co-locating these elements.

The workstations 108 are connectable to a media management server 112 for storing and managing media of incidents surveilled from public sources and workflow relating to that media. The media management server 112 will be discussed in greater detail further below. The command center 104 also includes a supervisory workstation 116 that is also connectable to the media management server 112. The links 120 interconnecting the workstations 108, the media management server 112 and the supervisory workstation 116 may be implemented as an intranet, or over the Internet, but in any event are typically encrypted. Note that the concept of command center 104 may be virtual and need not refer to a specific premises or co-location, in that media management server 112, workstations 108, and supervisory workstation 116 may also be remote and/or cloud-based and accessible by desktop computer, laptop, mobile telephone, etc.

The system 100 also includes one or more media source devices 124 that connect to the links 120 of the command center 104 via a network 128 such as the Internet. The technology and type of media associated with each of the media source devices 124 is not particularly limited. Generally, the media source devices 124 include input devices configured to capture media in the form video, audio, and/or text and to send that media to the media management server 112 via the network 128. The media source devices 124 may be surveillance equipment or any other type of equipment that is a source of media. In the example embodiment of system 100, the media source devices 124 include a drone media source device 124-1, a video doorbell media source device 124-2, a body-camera media source device 124-3 and a security camera 124-4. The media source devices 124-1 . . . 124-4 are thus all similar in nature in that they capture media in the form of video and/or audio information from public and/or private spaces. However, any type of media is contemplated, and thus a document media source device 124-0 is also shown. The document media source device 124-0 thus contemplates other forms of media such as reports, emails, spreadsheets or other document types or any other type of media that may require redaction before dissemination. Other example media source devices include data feeds received from one or more of a traffic camera, an automated teller machine (ATM), or a stream of text of information from an alarm notification system that monitors one or more of a building, a park, a fence, a parking lot, and other geographical locations (for example, a fire alarm, a toxic gas alarm, and the like).

Each media source device 124 thus also includes a network interface (not shown) for communicating with the other nodes in the system 100, including the media management server 112, via network 128 and links 120. The network interface of each media source device 124 can include its own unique hardware, drivers, and software according to different standards or protocols, to accomplish communications over network 128 and links 120. Example types of those hardware, drivers, and software for the network interfaces of each media source device 124 are discussed in greater detail below in relation to the media management server 112.

Figure 2:
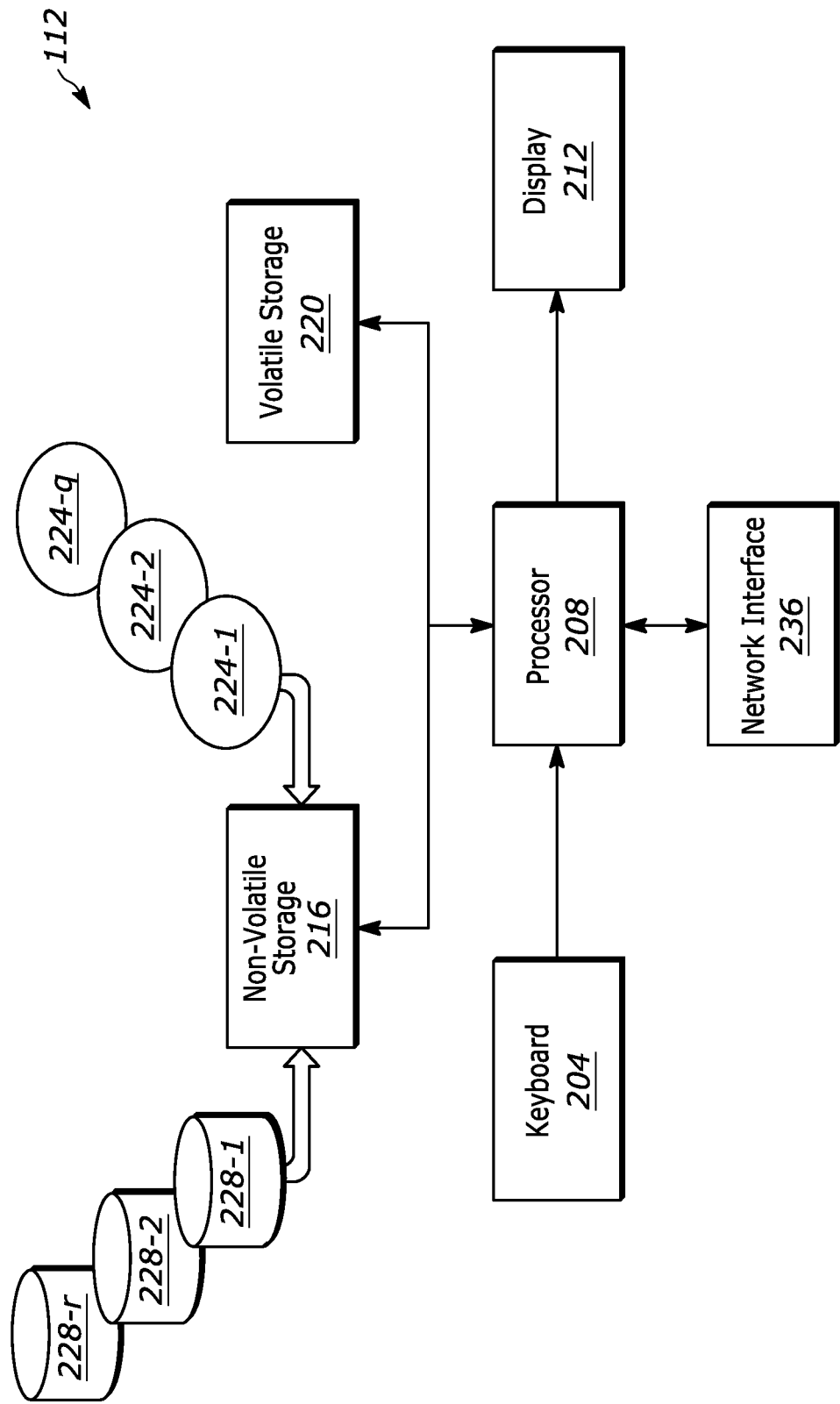
FIG. 2 is a block diagram representing the components of the engine from FIG. 1 in accordance with an example embodiment.

Referring now to FIG. 2, and expanding on certain elements shown in FIG. 1, a non-limiting example of the media management server 112 is shown in greater detail in the form of a block diagram. While the media management server 112 in FIG. 1 is shown as a single component, the functionality of the media management server 112 can be distributed amongst a plurality of components, such as one or more of a plurality of servers and/or cloud computing devices, all of which can be housed within one or more data centers. Indeed, the terms "server" or "engine" itself is not intended to be construed in a limiting sense as to the type of computing hardware or platform that may be used.

The media management server 112 may include at least one input device that in a present embodiment includes a keyboard 204. (In variants, other input devices are contemplated.) Input from keyboard 204 is received at a processor 208. In variations, processor 208 can be implemented as a plurality of processors. The processor 208 can be configured to execute different programing instructions that can be responsive to the input received via the one or more input devices. To fulfill its programming functions, the processor 208 is configured to communicate with at least one non-volatile storage unit 216 (e.g., Erasable Electronic Programmable Read Only Memory ("EEPROM"), Flash Memory, Hard-disk) and at least one volatile storage unit 220 (e.g., random access memory (RAM)). Non-volatile storage unit 216 may be implemented as a Read Only Memory (ROM) Programming instructions (e.g. applications 224) that implement the functional teachings of the media management server 112 as described herein are typically maintained, persistently, in the non-volatile storage unit 216 and used by the processor 208 that makes appropriate utilization of the volatile storage 220 during the execution of such programming instructions. The non-volatile storage unit 216 typically also includes programming instructions for initializing the components within the media management server 112.

The processor 208 in turn is also configured to control a display 212 and any other output devices that may be provided in the media management server 112, also in accordance with different programming instructions and responsive to different input received from the input devices.

The processor 208 also connects to a network interface 236, for connecting to the other nodes in system 100 via the links 120. The network interface 236 may thus be generalized as a further input/output device that may be utilized by processor 208 to fulfill various programming instructions. The network interface 236 may also be referred to as a communication unit. The network interface 236 may include one or more wired and/or wireless input/output (I/O) interfaces that are configurable to communicate with other components of the system 100. For example, the network interface 236 may include one or more wired and/or wireless transceivers for communicating with other components of the system 100. Hence, the one or more transceivers may be adapted for communication with one or more communication links and/or communication networks used to communicate with the other components of the system 100. The network interface 236 may include one or more transceivers, such as an Ethernet transceiver, a USB (Universal Serial Bus) transceiver, or similar transceiver configurable to communicate via a twisted pair wire, a coaxial cable, a fiberoptic link, or a similar physical connection to a wireline network. The network interface 236 may also be coupled to a combined modulator/demodulator (MODEM).

Thus, depending on the nature of the links 120 and/or the network 128 and/or the network interface respective to each media source device 124 or other network interface of the other nodes in the system 100, the network interface 236 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g, 802.11n, etc.), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series standard), a Worldwide Interoperability for Microwave Access (WiMAX) network, for example operating in accordance with an IEEE 802.16 standard, and/or another similar type of wireless network. Hence, the transceivers may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

As will become further apparent below, media management server 112 can be implemented with different configurations than described, omitting certain input devices, or including extra input devices, and likewise omitting certain output devices or including extra output devices. For example, the keyboard 204 and the display 212 can be omitted where the media management server 112 is implemented in a data center, with such devices being implemented via an external terminal or terminal application that connects to the media management server 112. As an example, the supervisory workstation 116 may be used as such an external terminal.

In the present example embodiment, the media management server 112 is configured to maintain, within non-volatile storage 216, various applications 224 and files 228. The applications 224 and the files 228 can be pre-stored in non-volatile storage 216 or downloaded via the network interface 236 and saved on the non-volatile storage 216. The processor 208 is configured to execute the applications 224, which accesses files 228, accessing the non-volatile storage 216 and the volatile storage 220 as needed. As noted above, and as will be discussed in greater detail below, the processor 208, when executing applications 224, controls its interactions with the workstations 108, the supervisory workstation 116, and the media source devices 124.

Figure 3:
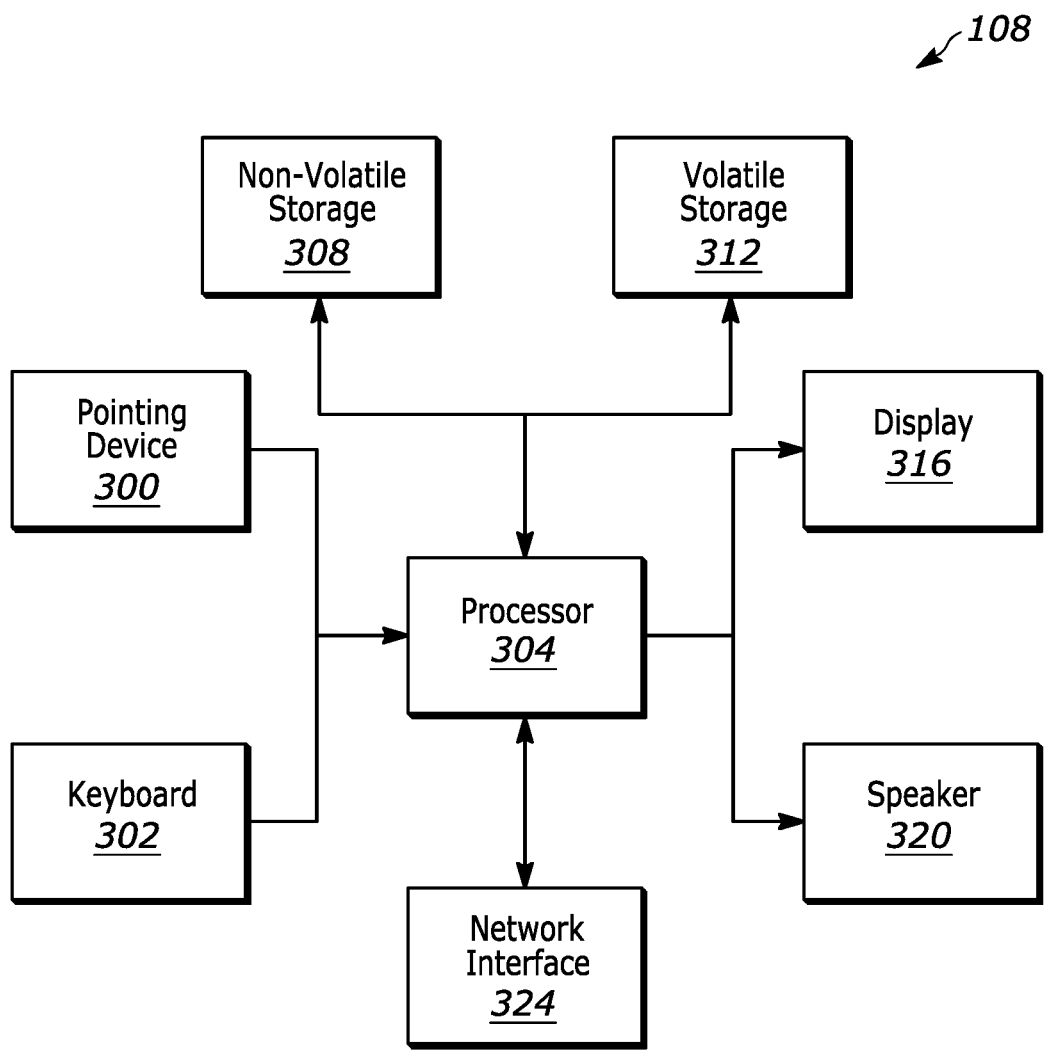
FIG. 3 is a block diagram representing the components of the workstations of FIG. 1 in accordance with an example embodiment.

Referring now to FIG. 3, a non-limiting example of one of the workstations 108 is shown in greater detail in the form of a block diagram. Workstation 108 may include at least one input device, which in a present embodiment includes a pointing device 300 and a key board 302. Other and/or different input devices that are contemplated. Input from pointing device 300 and keyboard 302 is received at processor 304. In variations, processor 304 may be implemented as a plurality of processors. Processor 304 can be configured to execute programming instructions that are responsive to the input received via the pointing device 300 and the keyboard 302. To fulfill its functions, the processor 304 is also configured to communicate with at least one non-volatile storage-unit 308, (e.g., EEPROM or Flash Memory) and at least one volatile storage unit 312 (e.g. Random Access Memory). Programming instructions that implement the functional teachings of workstation 108 as described herein are typically maintained, persistently, in non-volatile storage unit 308 and used by processor 304 that makes appropriate utilization of volatile storage 312 during the execution of such programming instructions.

The processor 304 is also configured to control a display 316 and a speaker 320 and any other output devices that may be provided in workstation 108, also in accordance with programming instructions and responsive to different input from the input devices. Other and/or different input devices are contemplated.

The processor 304 also connects to a network interface 324, for connecting to the links 120. Network interface 324 can thus be generalized as a further input/output device that can be utilized by processor 304 to fulfill various programming instructions. Processor 304 is configured to bi-directionally communicate with other nodes in system 100, including the media management server 112, via the network interface 324 and the links 120, accessing non-volatile storage 308 and volatile storage 312 as needed. A person of skill in the art will now recognize that the previous discussion regarding network interface 236 can likewise be applied to the network interface 324.

As will now be understood by a person skilled in the art, each workstation 108 can be of a variety of form factors including a laptop computer, mobile telephone, table computer, desktop computer or the like. Indeed, each workstation 108 can be implemented with different configurations than described, omitting certain input devices, or including extra input devices, and likewise omitting certain output devices or including extra output devices.

The infrastructure of workstation 116 can thus also be based on the same types of infrastructure as workstations 108.

To further assist in understanding system 100, reference will now be made to FIG. 4 which shows a flowchart indicated generally at 400, depicting a process for analyzing and monitoring media redaction performance. Hereafter, the flowchart will be referred to as process 400. Process 400 can be implemented on system 100, but it is to be understood that process 400 can also be implemented on variations of system 100, and likewise, process 400 itself can be modified and operate on system 100. It is to be understood that the blocks in process 400 need not be performed in the exact sequence shown and that some blocks may execute in parallel with other blocks, and process 400 itself may execute in parallel with other processes. Additional processes discussed herein in relation to system 100 are subject to the same non-limiting interpretation.

Before discussing process 400 in greater detail, certain contextual considerations will be outlined. In the example embodiment of system 100 process 400 is performed by media management server 112. The media management server 112 is generally configured to receive raw media files from, either directly or indirectly, media source devices 124. A "raw" media file thus contains unredacted information that may be subject to a request for public disclosure, as per the previous discussion and context in relation to media source devices 124. The following discussion, for illustrative purposes, will focus on an example of a video file containing video and audio information received from drone media source 124-1. It will also be assumed that drone media source 124-1 is operated by a law enforcement agency and is deployed to surveil an example public safety incident, namely a car accident.

Figure 5:
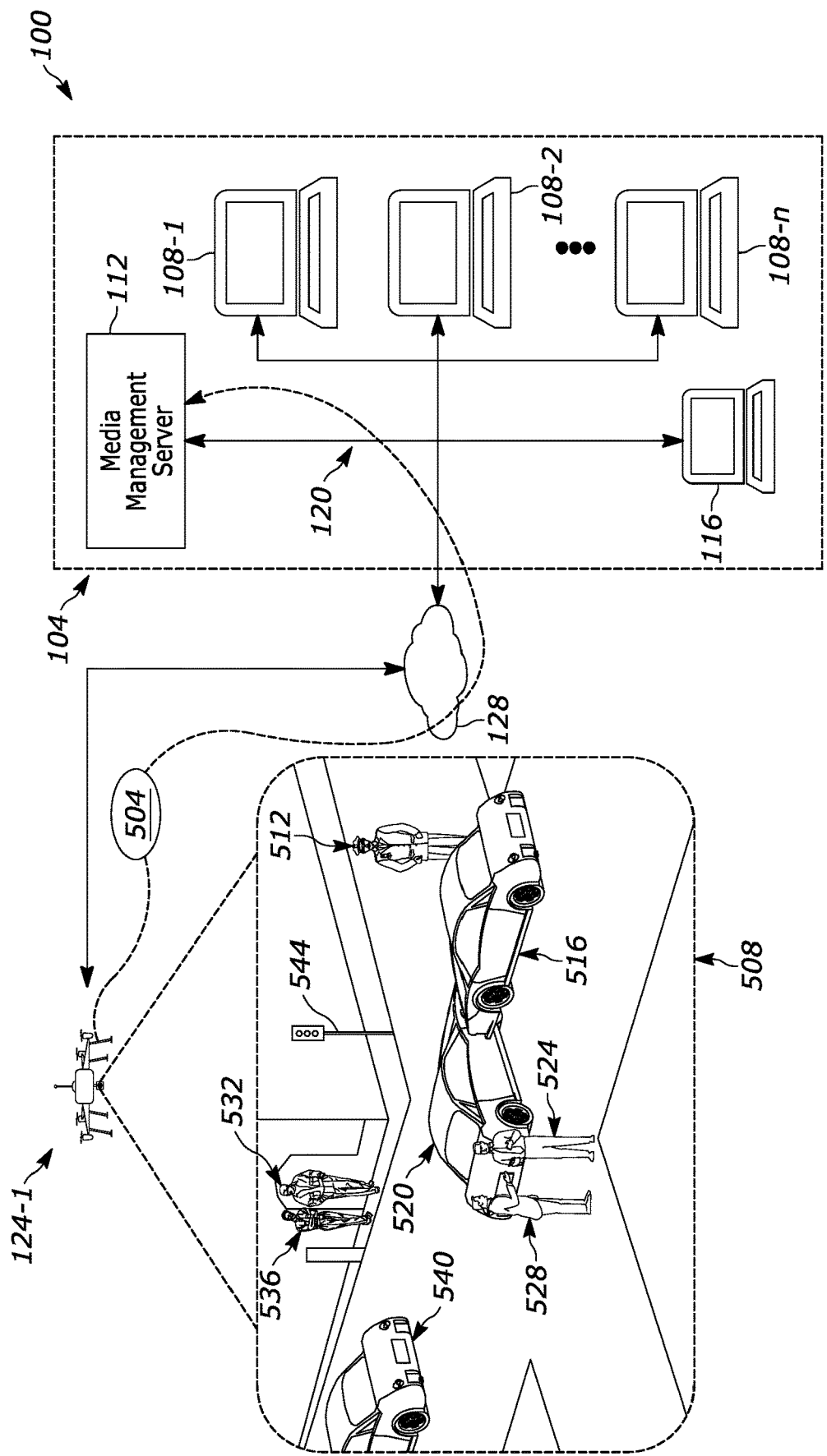
FIG. 5 shows a portion of the system of FIG. 1 including an example capture of a raw media file.
Figure 6:
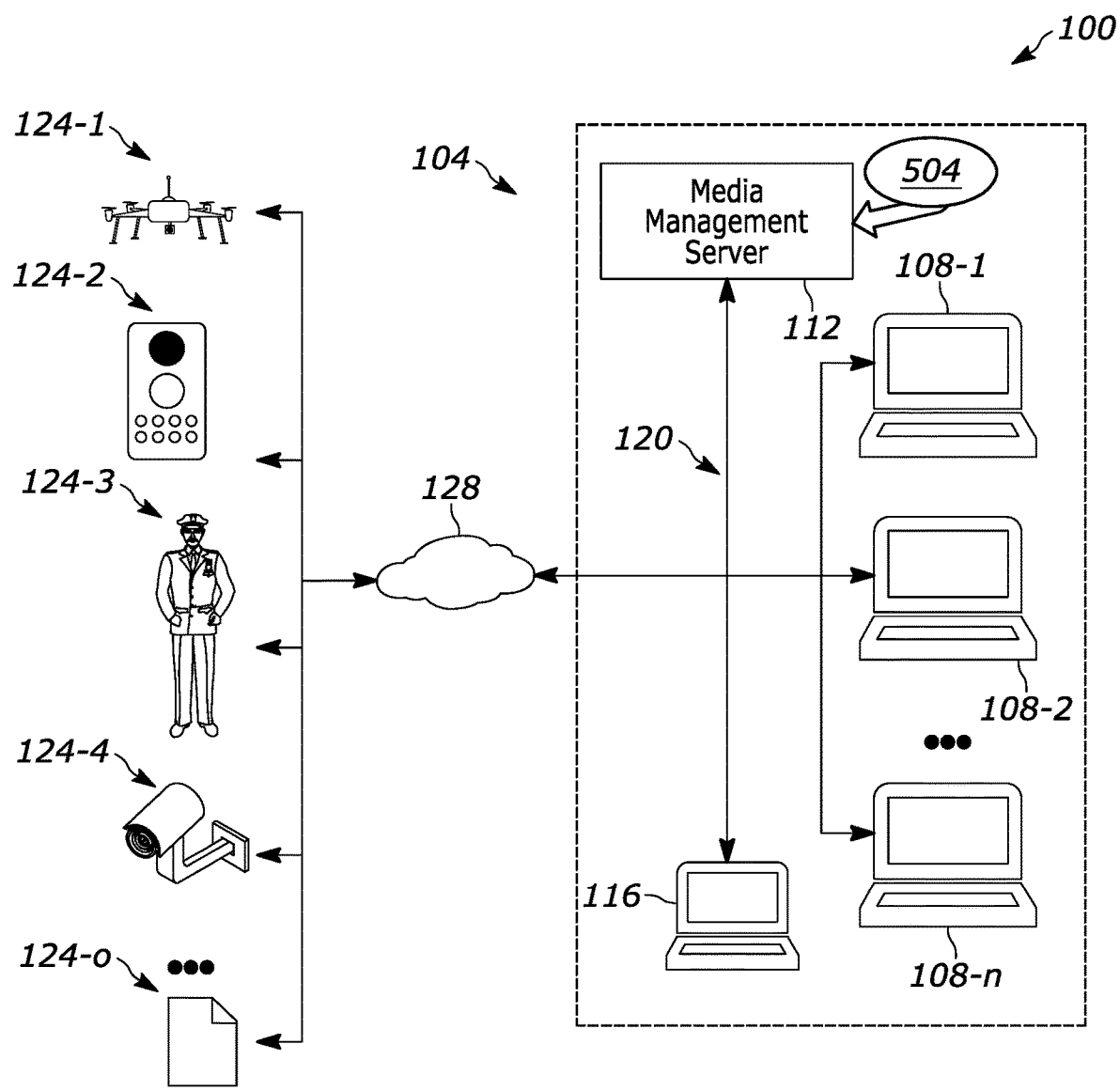
FIG. 6 shows the system of FIG. 1 with a raw media file stored on the media management engine in accordance with an example embodiment.

Thus, as shown in FIG. 5, the drone media source 124-1 is shown as delivering a raw media file 504 via network 128 and links 120 to media management server 112. Raw media file 504 thus captures a series of frames of video and audio information of the car accident. A video frame of raw media file 504 is indicated generally at 508. Frame 508 shows a police officer 512, a first vehicle 516, a second vehicle 520, a first driver 524, a second driver 528, a first bystander 532, a second bystander 536, a bystander vehicle 540 and a road sign 544. Raw media file 504 and the footage of the car accident including frame 508 is thus uploaded and saved to non-volatile storage 216 of media management server 112. Referring now to FIG. 6, raw media file 504 is shown as being stored on media management server 112.

With the system 100 in the example state shown in FIG. 6, the context is established for beginning discussion of process 400. Block 404 comprises receiving a baseline redacted version of a media file. According to the example in FIG. 7, block 404 comprises raw media file 504 being processed in some fashion to produce a baseline redacted version of media file 504, hereinafter referred to as baseline media file 504-B.

Figure 7:
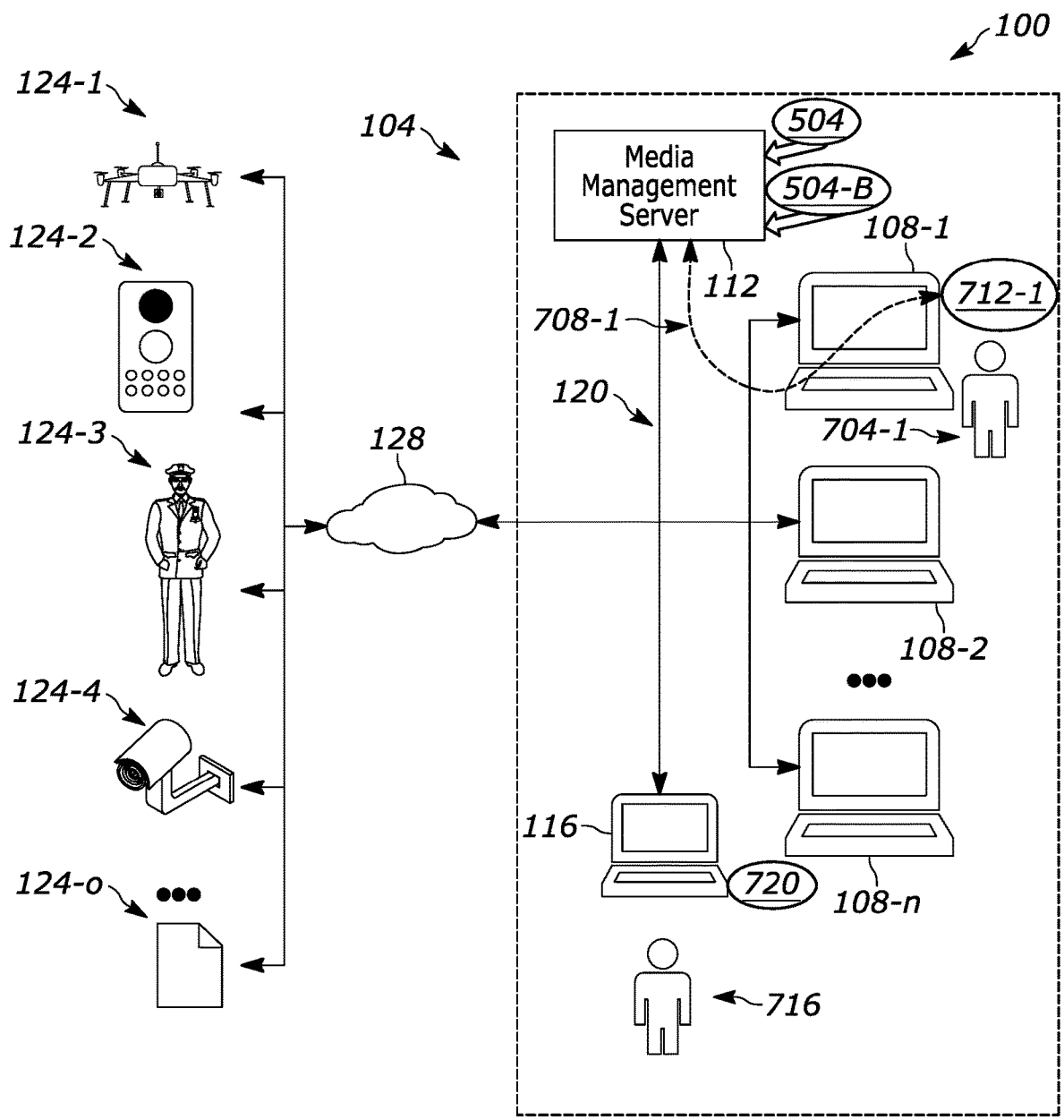
FIG. 7 shows the system of FIG. 6 as the raw media file is being processed into a baseline redacted media file in accordance with an example embodiment.
Figure 8:
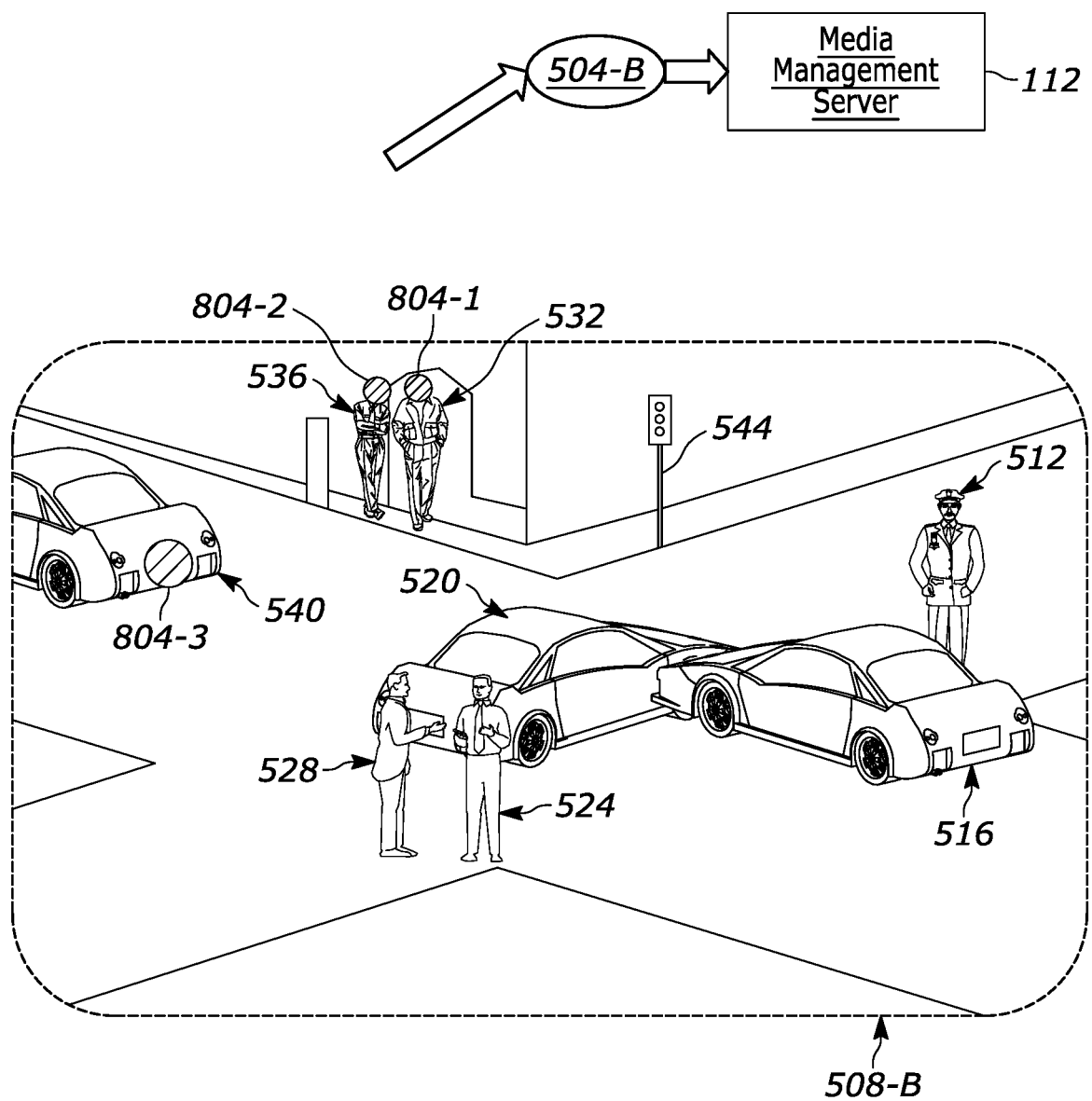
FIG. 8 shows an example of the redaction being performed in FIG. 7.

As shown in FIG. 7, the baseline redacted media file is indicated at 504-B and stored on media management server 112. In FIG. 8, the baseline redacted media file 504-B is also shown including redacted frame 508-B, as stored on the media management server 112. Note that the redacted frame 508-B includes a first blurring effect 804-1 over the face of first bystander 532; a second blurring effect 804-2 over the face of second bystander 536 and a third blurring effect 804-3 over the license plate of bystander vehicle 540. Blurring effects 804 thus represent redactions of raw media file 504, and the combined blurring effects 804 of all frames, including frame 508-B, culminate in the baseline redacted media file 504-B. (Optionally, an expected duration of time to complete the redaction process between the state of raw media file 504 and baseline redacted media file 504-B can also be stored in conjunction with based line redacted media file 504-B.)

Note that blurring effects 804 are but one type of redaction effect. Audio redaction can be performed by silencing portions of the media file 504, or by replacing those portions with distortion effects or different sounds. A person of skill in the art will now appreciate that any type of redaction effect can be applied in order to remove personally identifiable information or any other type of information that is to be omitted from the raw media file 504.

The means by which baseline redacted media file 504-B is generated is not particularly limited. One option is manual redaction for which an example arrangement is shown in FIG. 7, in which, a redaction agent 704-1 is shown in association with a secure session 708-1 between media management server 112 and workstation 108-1. Manual redaction can thus be accomplished via redaction agent 704-1 operating workstation 108-1 through a redaction agent account 712-1 respective to the redaction agent 704-1. To elaborate, a redaction agent 704 is an individual that is trained to manually review raw media files, such as raw media file 504, and to apply redactions including blurring effects 804 across frames, such as frame 508. The blurring effects 804 are applied to the raw media file 504 to produce baseline redacted media file 504-B. A redaction agent account 712 uniquely identifies the identity of a given redaction agent 704 on media management server 112, by means of authorization credentials and the secure session 708 between workstation 108 and server 112 to track the fact that a given redaction agent created a given redacted media file. The redaction agent account 712 can thus be used to also monitor redaction performance for each redaction agent 704, as will be explained further below.

Instead of manual redaction, baseline redacted media file 504-B may be fully or partially created using automation techniques that may include artificial intelligence or the use of neural networks. Combinations of automation and manual techniques may be employed to generate baseline redacted media file 504-B. Baseline redacted media file 504-B, itself, may be reviewed for correctness by a plurality of different redaction agents 704 or a redaction agent supervisor 716 at supervisor workstation 116 via a redaction agent supervisor account 720. (In variants, baseline redacted media file 504-B may also be reviewed for correctness by a neural network or other software.) However generated, baseline redacted media file 504-B is deemed within system 100 to be "correctly redacted", or otherwise agreed upon as having the appropriate number and placement of redaction effects to fulfill the redaction function in the context of raw media file 504 that renders baseline redacted media file 504-B to be ready for release to the public or any other entity that has requested a copy of media file 504.

A person skilled in the art will again recognize the degree of potential subjectivity that may be involved in generating baseline redacted media file 504-B. Notably, blurring effects 804 were not applied to all faces or license plates in frame 508-B; the faces of police officer 512, first driver 524, second driver 528 were left untouched; but in certain contexts perhaps blurring effects 804 should have been so applied to generate a correctly redacted baseline redacted media file 504-B. The point of this part of the specification is not to define rules as to where blurring effects 804 are to be applied, only to note that a certain level of skill and judgment are used. Regardless, for purposes of this specification, the example frame 508-B in FIG. 8 will be assumed to have been correctly redacted.

Referring again to FIG. 4, block 408 comprises receiving a comparative redacted version of the media file. Again, the means by which the comparative redacted version of the media file is received is not particularly limited and may be performed manually, automatically, or by combinations thereof. Example performance of block 408, however, is shown in FIG. 9 as a second redaction agent 704-2 is shown as having processed raw media file 504 to generate the comparative redacted media file 504-C via a session 708-2 and a respective redaction agent account 712-2.

Figure 9:
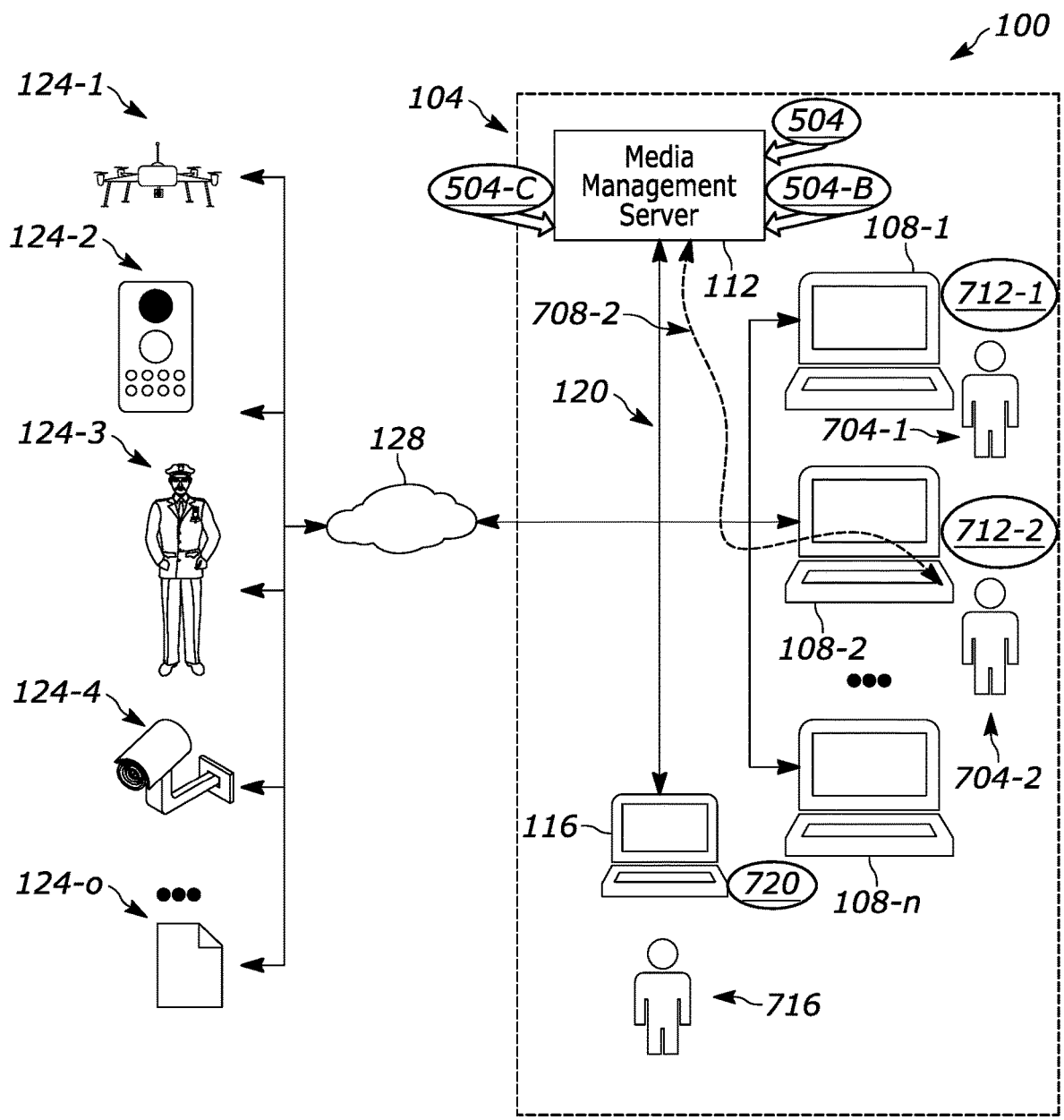
FIG. 9 shows the system of FIG. 1 as the raw media file is being processed into a comparative redacted media file in accordance with an example embodiment.
Figure 10:
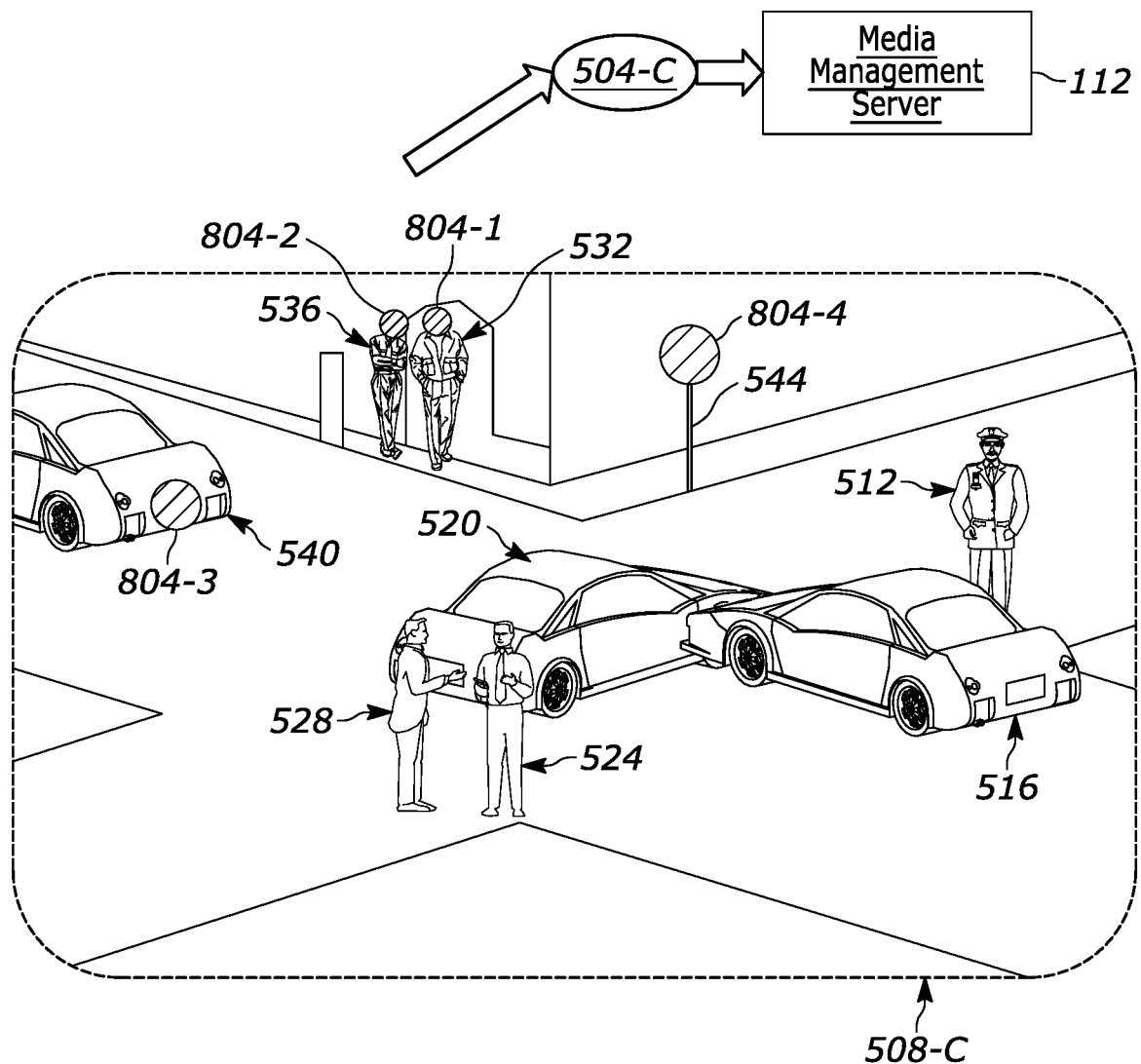
FIG. 10 shows an example of the redaction being performed in FIG. 9.

As shown in FIG. 9, the comparative redacted media file is indicated at 504-C and stored on media management server 112. In FIG. 10, the comparative redacted media file 504-C is also shown including a redacted frame 508-C, as stored on the media management server 112. Note that the redacted frame 508-C includes the first blurring effect 804-1 over the face of the first bystander 532; the second blurring effect 804-2 over the face of second bystander 536, the third blurring effect 804-3 over the license plate of bystander vehicle 540, but also includes a fourth blurring effect 804-4 over a signpost 544. Blurring effects 804 thus represent redactions of raw media file 504, and the combined blurring effects 804 of all frames, including frame 508-C, culminate in the comparative redacted media file 504-C. (Optionally, the duration of time taken to complete the redaction process between the state of raw media file 504 and the comparative redacted media file 504-C can also be stored in conjunction with comparative redacted media file 504-C.)

Referring again to FIG. 4, at block 412 a determination is made as to the differences between the baseline redacted version from block 404 and the comparative redacted version from block 408. In a general sense, block 412 is based on creating a table, index or other type of list of the different redaction effects that were applied at block 404 versus the redaction effects that were applied at block 408. Block 412 may, in certain embodiments, also include a comparison between an expected duration of time to generate the baseline redacted version in comparison to the actual duration of time that was taken to generate the redacted version.

According to the illustrative examples in FIG. 8 and FIG. 10, it can be noted that the comparative redacted version 504-C correctly applied first blurring effect 804-1, second blurring effect 804-2, and third blurring effect 804-3 in the same manner as applied to baseline redacted version 504-B. However, comparative redacted version 504-C incorrectly applied an additional, fourth blurring effect 804-4 to signpost 544. The determination at block 412 notes such a difference.

Referring again to FIG. 4, at block 416 a performance ranking is determined. The performance ranking can be associated with the redaction agent account 712-2 associated with the generation of comparative redacted version 504-C. The performance ranking can be based on any metrics, such as a percentage or total correctly applied redaction effects, such as blurring effects 804 out of a total number of expected correctly applied redaction effects. Another basis for the performance ranking can be based on a total number of incorrectly applied redaction effects. Another basis for the performance ranking can be relative to other redaction agent accounts 712 that have generated their own comparative redacted versions that have also been cycled through process 400. Another basis for the performance ranking can be the difference between the actual amount of time to generate the comparative redacted version 504-C versus the expected amount of time to generate the baseline redacted version 504-B. Other performance ranking criteria will occur to those of skill in the art.

At block 420, a display is controlled to cause the performance ranking from block 416 to be displayed. Block 420 can, but need not be, effected immediately after performance of block 416. The performance ranking may be generated on the individual workstation 108 of the respective redaction agent 704 logged into her/his respective redaction agent account 712. The performance ranking may be generated in real-time during the actual redaction process of a given media file by the redaction agent 704 to try and improve redaction performance during the redaction process. Alternatively, or in addition, the performance ranking may be generated subsequent to the redaction process. Alternatively, or in addition, the performance ranking may be generated on the supervisory workstation 116 associated with a respective supervisory redaction agent account 712.

As an alternative to block 420, or in addition to block 420, if the performance ranking of block 416 falls below a certain threshold, then system 100 can deem that the associated redaction agent 704 requires additional redaction training and can create a workflow queue associated with the redaction agent account 712 that includes additional raw media files that are dedicated to training and for which there are corresponding baseline redacted media files. In this manner, process 400 can be repeated to provide training, via the respective redaction agent account 712, for a given redaction agent 704, until a sufficient number of comparative redaction media files have been created that only deviate in redaction effects and/or duration of time to complete, if at all, within an acceptable threshold margin of the baseline redaction media file. An acceptable threshold margin can be selected according to the context, but can, for example, be greater than about 80%, 90%, or 95% of correctly applied redactions, or less than about 5%, 10%, or 20% of incorrectly applied redactions, or some combination thereof. (In a variant, the redaction agent 704 may, or may not, be made aware of which media files are training files in their queue so as to control for possible biasing effects of knowing whether a media file is training file, or not.)

As a further alternative to block 420, or also in addition to block 420, if the performance ranking of block 416 exceeds a certain threshold (such as but not limited to those noted above), then system 100 can deem that the associated redaction agent 704 has been adequately trained, and can then create a workflow queue associated with the redaction agent account 712 that includes additional raw media files that are of current public safety or other incidents that require redaction before release to the public. In this manner, process 400 can be repeated to provide training and/or assign workload to the respective redaction agent account, for a given redaction agent 704.

As an enhancement to block 420, the performance ranking may be displayed in a different format if the ranking exceeds a predetermined threshold. The difference in format is not particularly limited and can include color, font size, flashing, sound effects or the like. To elaborate, this embodiment contemplates that the display at block 420 can be in a dashboard format, where if the performance ranking falls below an accepted threshold than an alert, perhaps using the color red, is generated in association with the performance ranking to call for further action in relation to the training of the relevant redaction agent. Conversely, the color green may represent that the redaction agent is producing redacted media files within an acceptable range of performance rankings that are suitable for immediate release.

A person skilled in the art will now appreciate how the performance ranking may also help the predictability of future redactions. Performance rankings can be performed at the level of an individual media, but also aggregated or mapped into performance rankings for redaction agents and teams of redaction agents. These concepts are discussed in greater detail below.

Figure 11:
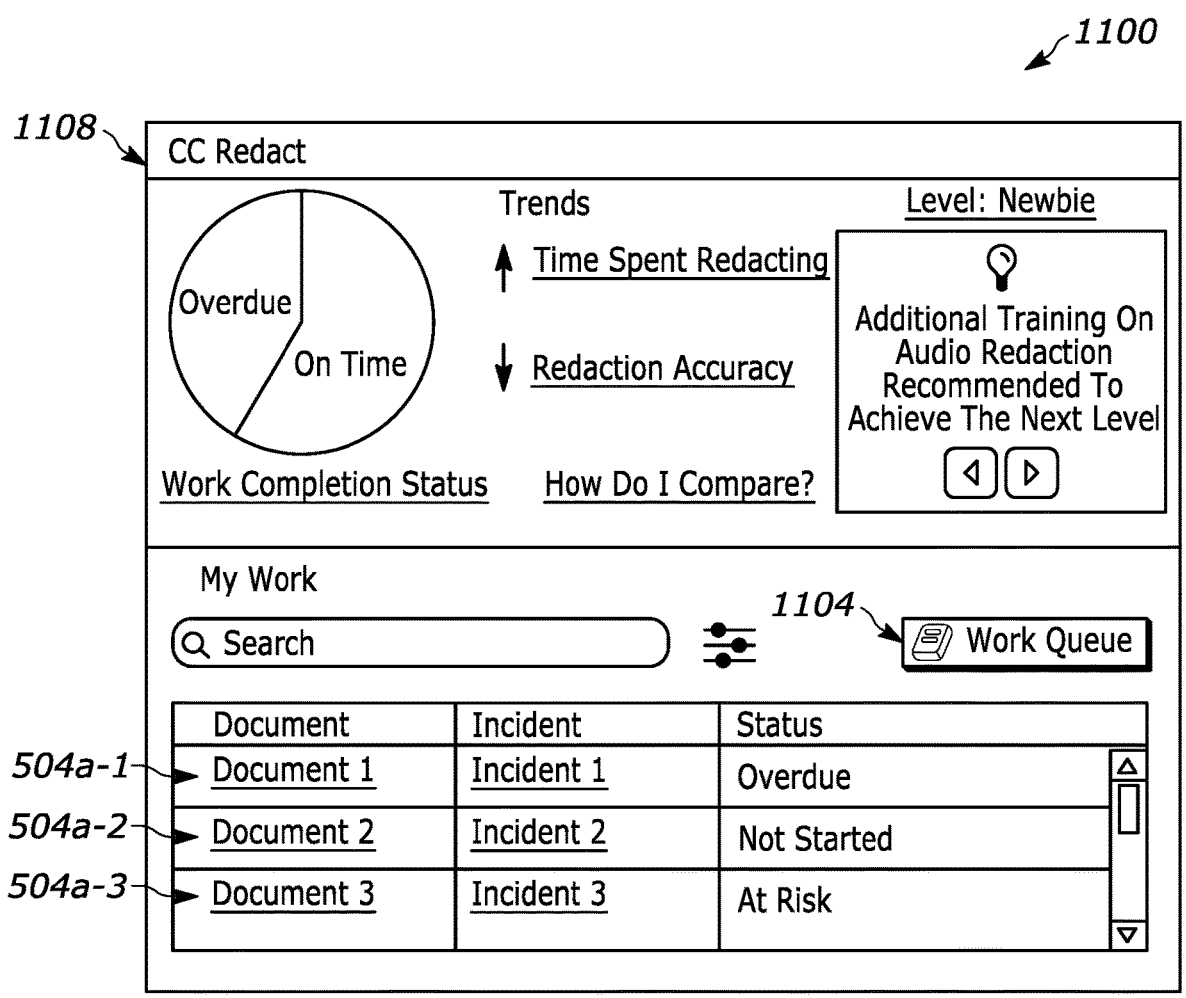
FIG. 11 shows an example dashboard that can be generated upon completion of the process of FIG. 4 by controlling a display to generate the dashboard.

FIG. 11 shows one example dashboard 1100 that can be part of block 420. Dashboard 1100 contemplates several passes through process 400 to generate a collection of data and performance rankings regarding a given redaction agent 704. Dashboard 1100 can be associated with a given redaction agent account 712 and generated on a workstation 108 of a respective redaction agent 704. Dashboard 1100 may include a workflow queue 1104 comprised of a list of further media files 504 for the redaction agent 704 to complete. Such media files 504a may be of live incidents or represent training incidents. Performance rankings are shown in performance ranking frame 1108, indicating overall status of whether redaction work is "overdue" or "on-time". "Overdue" items would be flagged based on a cumulation of expected completion times for items in the queue 1104. Expected completion times for raw media files for which no redactions have been performed can be based on meta-analysis comparisons between a given raw media file and previously redacted media files of substantially similar type and/or substantially similar length. Performance ranking frame 1108 can also indicate trends in relation to expected times for completing redactions versus accuracy of redactions. An option to display comparisons between other redaction agent accounts 712 is contemplated. As part of such comparisons, an overall level indicator can also be provided, indicating levels such as "trainee" or "beginner" or "intermediate" or "advanced".

It is to be understood that many different media file types are contemplated including audio (e.g. mp3, wav, etc.), video (e.g. mp4, wmv, etc.), and/or text (.doc, .txt, etc.) and/or combinations thereof. It is also to be understood that many different types of incidents are contemplated including public safety incidents such as robber, car accidents, and/or assaults, etc. The KPIs can vary and/or be specific according to the media file type and/or the type of incident.

In other embodiments, enhancements and variations to the workflow queue 1104 are contemplated. For example, the teachings herein can be applied to prioritization of various items in the workflow queue 1104 depending on a determined set of strengths for a given redaction agent 704. Such strengths can be objectively determined using the process 400 and its variants. Strengths can include emphasis on different types of media files 504a or different capacities for completing certain types of media files 504a within certain expected durations.

Figure 12:
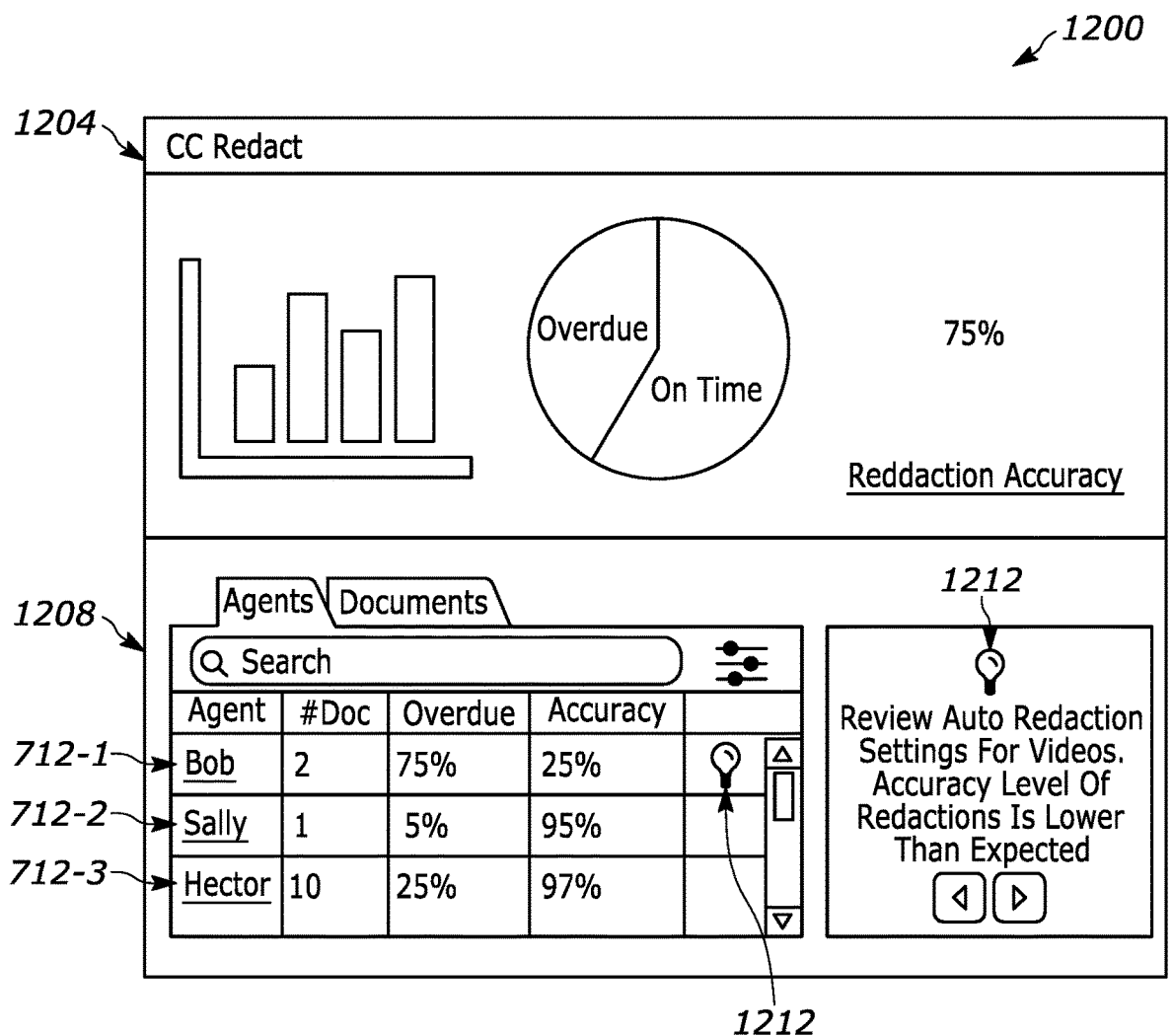
FIG. 12 shows another example dashboard that can be generated upon completion of the process of FIG. 4 by controlling a display to generate the dashboard.

FIG. 12 shows another example dashboard 1200 that can be part of block 420. Dashboard 1200 contemplates several passes through process 400 for several different redaction agent accounts 712 to generate a collection of data and relative performance rankings regarding several different redaction agents 704. Dashboard 1200 can thus be associated with a given supervisory redaction agent account 720 or other agency or collective that oversees a collection of redaction agents 704. The top frame 1204 may thus show an aggregate score for a plurality of redaction agent accounts 712 while a lower frame 1208 may show a list of performance rankings for each redaction agent account 712. Each performance ranking can include, for each agent account 712, a total number of documents or media files (such as media files 504a) that require redaction processing, an indication of how many of those documents or media files are overdue for redaction processing, and an overall accuracy rate for previously redacted documents or media files. Formatting for a given performance metric can be changed to indicate status, such as by changing text or formatting of a result, such as applying "red" text indicating poor performance or "black" text indicating adequate performance. A recommendation flag 1212 can be also associated with each agent account 712 that includes text for suggested specific courses of remedial action or training for the redaction agent—704 Further enhancements to the dashboard 1200 can be provided whereby selecting a given agent account 712 (e.g., "left-clicking" on "Bob", or recommendation flag 1212 in dashboard 1200) may open another screen or dashboard that shows a side-by-side comparison of the differences between the baseline and comparative redactions, allowing the supervisor to rapidly "drill down" and visually evaluate the specific defects that were located and flagged for the redaction agent 704 and that led to the performance ranking for that redaction agent 704.

It is to be understood that aspects of dashboard 1100 may be combined into dashboard 1200 and vice versa. Furthermore, other enhancements and variations to dashboard 1100 and/or dashboard 1200 are contemplated. For example, either dashboard 1100 or dashboard 1200 can present statistics about the performance of a given redaction agent 704. Such statistics can be generated on the dashboard 1100 or dashboard 1200 to include a link that can be "clicked" or hovered over to see more details such as whether there are commonalities related to the statistics across different redaction agents 704 or different media files 504.

Furthermore, various trends in the current work of a given redaction agent 704 can be visible to each redaction agent 704 so they can see how their performance compares to other redaction agents 704.

Redaction agents 704 can be assigned a level based on their performance and shown on the dashboard. Specific training, including the assignment of different training media files, may be suggested to a given redaction agent 704 improve their level, or to mitigate a specific trend (such as increasing time to perform redactions), or the dashboard may include text or graphics that suggests to prioritize the workflow queue 1104 to work on a specific media file 504 in order to more efficiently process the queue 1104, or highlight expectations that certain media files 504 may require additional attention or time, such as the fact that it may be expected to take additional time to redact a media file 504 that includes dialogue from a foreign language.

As noted, the workflow queue 1104 may include a list of assigned redaction media files 504 as well as their current status. The list may be ordered based on priority. Warnings may be provided if the documents were overdue or at risk of being overdue.

Functionality within a dashboard may include the capability for a redaction agent 704 to control the dashboard to manually assign additional work by opening an overall workflow queue that contains unprocessed media files 504 that may or may not have been assigned to any redaction agent 704 but nonetheless remain unprocessed or warrant duplicative or further processing. Such an overall workflow queue may indicate which media files 504 may best fit the skill set (e.g. types of media files that a given redaction agent 704 has demonstrated prior competency in performing accurately, expected durations to complete for a given redaction agent 704) and that were the next highest priorities based on external sources requesting processing of the media files 504a. A warning may be given if the addition of a new media file 504a may jeopardize timely or accurate processing of an existing media file 504a in the queue 1104 for a given redaction agent 704.

The dashboard 1200 may be modified to include a view that supports multiple agencies so that statistics could be compared between teams of redaction agents 704. A team of redaction agents 704 may be associated with an entire agency or other grouping of redaction agents 704. Suggestions could be made for specific agencies based on differentiations with other agencies. To clarify, an agency can represent a team of redaction agents 704 each with their own redaction agent supervisor 716. The statistics discussed in relation to FIG. 11 and FIG. 12 can be offered comparatively amongst those different teams.

The dashboards may be enhanced or modified to include basic graphical representations that include overall team or agency key performance indicators (KPIs), or basic trends similar to the redaction agent view in FIG. 11 but across the entire team of agents 704. The ability to view the underlying data used to formulate the KPI can be included by selecting the KPI by "hover" or "click" of a mouse cursor or other inputs.

The dashboards may allow the viewing of KPIs of agents 704 and perform more enhanced queries and reports to derive more specific details. The redaction agent supervisor 716 may be provided reporting tools that filter to only show certain agents 704 that require reviews or other actions, such as those agents 704 that fall below threshold in a KPI and/or have suggested trainings.

In certain dashboard views, all media files 504 to be redacted may be available for viewing, selection and/or assignment to one or more redaction agents 704. The status of the media file 504 may also be shown. If already assigned, then the redaction agent 704 to which the media file 504 has been assigned, as well as the incident to which the media file 504 is related, may be shown. The workflow queue 1104 may also include media files 504 where the redaction is complete but should be reviewed by another redaction agent 704 or the redaction agent supervisor 716. The media files 504 may be filtered based on status or on the need to be reviewed.

KPIs and/or suggestions that affect the team of redaction agents 704 as a whole may be displayed, including possible interpretations for why the KPIs are in a certain state, such as whether automated redactions or manual redactions are showing higher error rates.

Alerts indicating decreased performance of individual redaction agents 704 or teams of redaction agents 704 may be displayed. Conversely, dashboards may also highlight improvements and/or positive trends and/or the how those improvements might be applied to other agents 704 or other teams of agents 704.

As discussed above, the baseline redacted version from block 404 of process 400 can be derived from different sources. Furthermore, the baseline redacted version may include different variables that are part of the comparison at block 408 and part of the performance ranking generated at block 416. Example variables include the amount of time to complete the redaction and the number and types of redactions that are performed. Additional tags can be associated with the media files including the type of the file such as whether the media file is a document, video, audio, or text or combinations, and subordinate tags such as the length of the media file, the language or languages within the media file, the number and types of artifacts for redaction within the media file.

Figure 13:
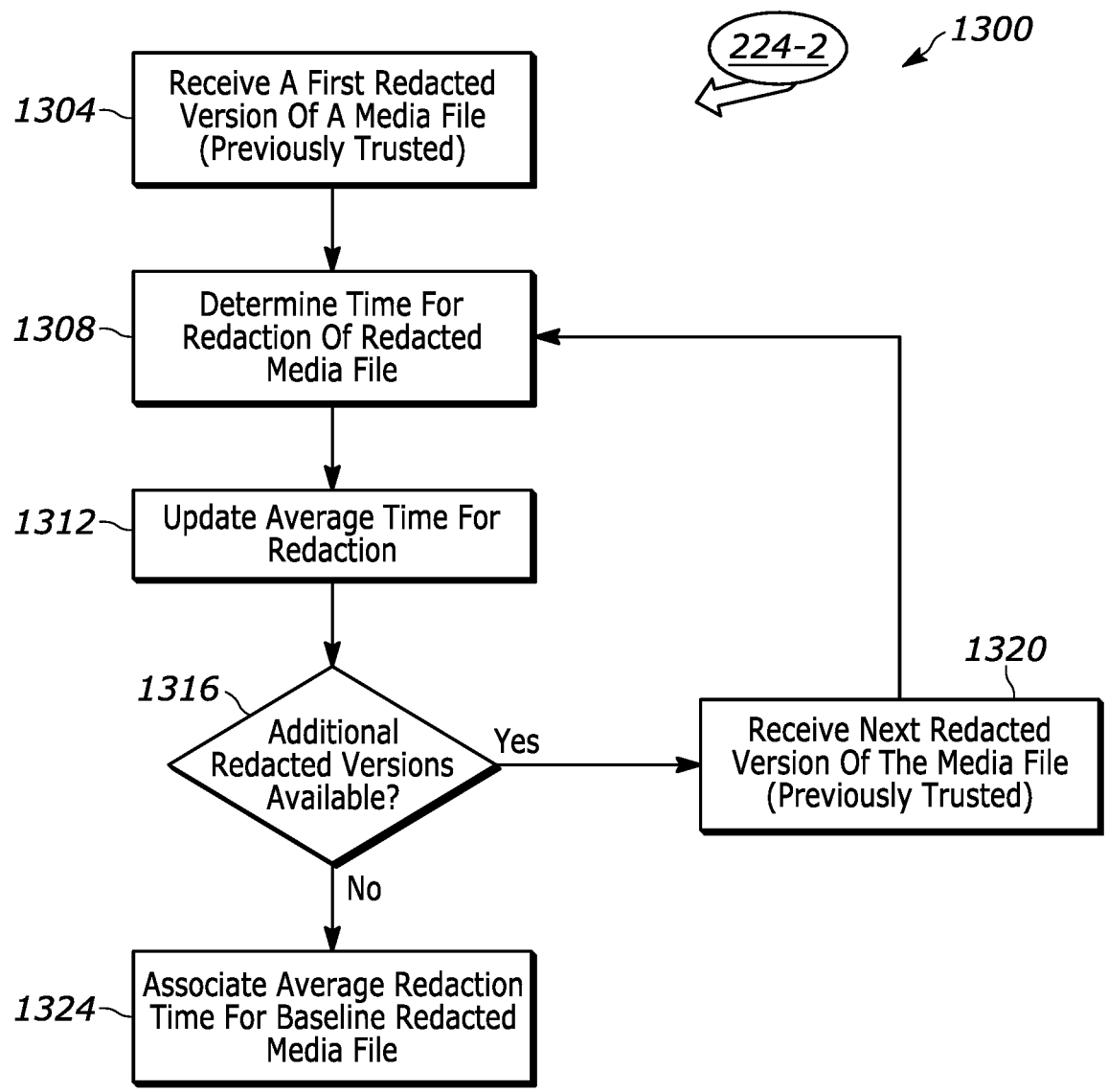
FIG. 13 is another flowchart depicting a process for establishing a baseline redaction time that can be part of the baseline redacted version of the media file from the process of FIG. 4 in accordance with an example embodiment.

Accordingly, FIG. 13 shows a non-limiting example of a process 1300 for establishing a baseline redaction time that can be part of expected performance metrics associated with the baseline redacted version referenced at block 404, which are fed into the performance comparison at block 412. Block 1304 comprises receiving a first redacted version of a media file that has been previously vetted and is trusted. To elaborate, the first redacted version at block 1304 has been through a quality control process, such as one or more reviews by humans that are trusted. The redacted media file at block 1304 can be initially generated by a human or an automated tool. Block 1308 comprises determining an amount of time taken to generate the redacted version received at block 1304. Block 1312 comprises updating an average redaction time for the specific redacted media file received at block 1304. Block 1316 comprises determining if there are additional versions of the redacted media file. To elaborate, since process 1300 is a portion of a training process for use in process 400, a plurality of trusted redacted versions of the media file at block 1304 can be contemplated. Accordingly, if there are a plurality of trusted versions of the media files then process 1300 will advance from block 1316 to block 1320, looping back through block 1308, block 1312 and block 1316 until all trusted redacted versions have been used to generate an updated average time for redaction. Thus a "no" at block 1316 leads to block 1324 and an average redaction time that is associated with the baseline redacted media file 504-B that is introduced at block 404 of process 400. That average redaction time can then be part of block 412 of process 400, by comparing the average redaction time from block 1324 with the redaction time associated with the comparative redacted version 504-C from block 408. The compared redaction time can thus be part of the performance ranking generated at block 416.

Figure 4:
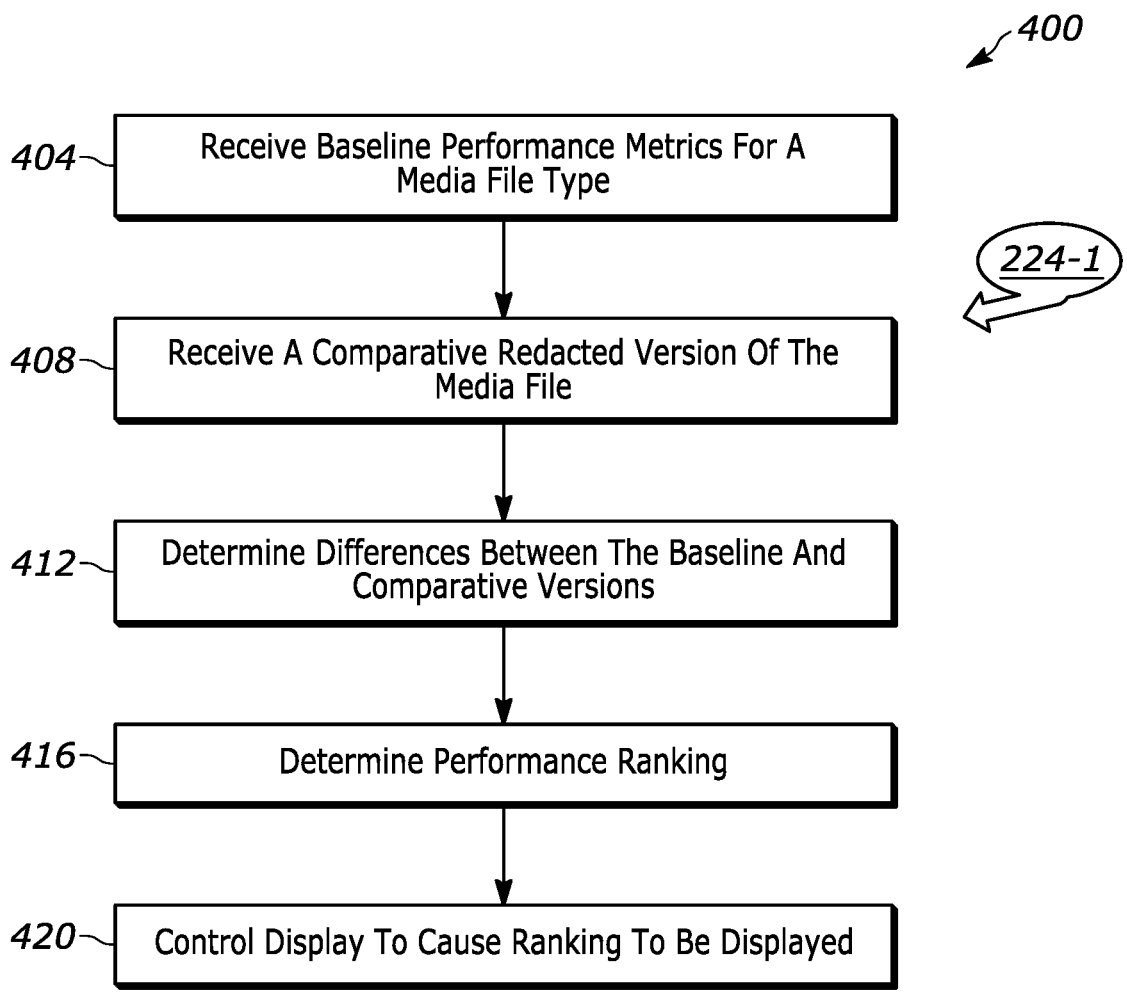
FIG. 4 is a flowchart depicting a process for monitoring and analyzing media redaction performance in accordance with an example embodiment.
Figure 14:
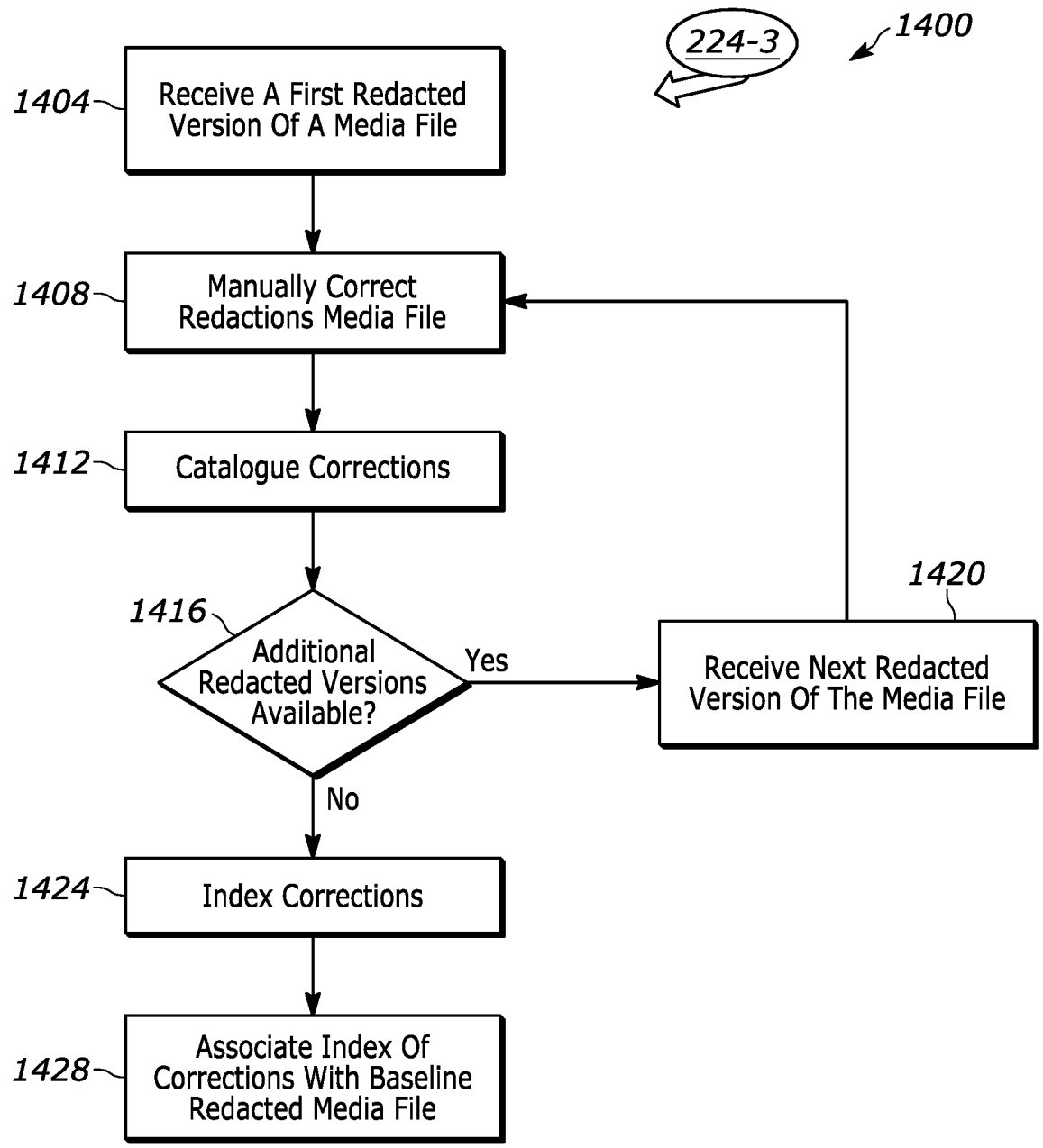
FIG. 14 is another flowchart depicting a process for establishing a baseline index of expected manual corrections that can be part of the baseline redacted version of the media file from the process of FIG. 4 in accordance with an example embodiment.

FIG. 14 shows a non-limiting example a process 1400 for establishing a baseline index of expected corrections that can be part of the expected performance metrics associated with the baseline redacted version 504-B of the media file from the process of FIG. 4. Block 1404 comprises receiving a first redacted version of a media file, such as comparative redacted version 504-C. Note that the redactions in the version received at block 1404 are not approved as "trusted" and that process 1400 is part of a process to develop a trusted baseline redacted media file. Block 1408 comprises a trusted redaction agent or other human to review the media file received at block 1404 and applying any manual corrections to the redacted version from block 1404. Such corrections can include removing or changing any of the redactions in the version received at block 1404, or adding new redactions to the redacted version from block 1404.

Block 1412 comprises storing the corrections made at block 1408. Block 1412 can have particular application to a machine learning algorithm that monitors the corrections that were made at block 1408.

Block 1416 comprises determining if there are additional redacted versions available, and if "yes", then advancing to block 1420 where the next redacted version of the media file is received. The version(s) received at block 1420 are based on the same unredacted raw media file 504 that was received at block 1404, but which have been redacted by different individual redaction agents 704 or automated redaction algorithms. Thus the version(s) received at block 1420 are not shown in the Figures but reflect a plurality of comparative redacted versions in addition to comparative redacted version 504-C. Thus block 1408, block 1412, block 1416 and block 1420 repeat until all of the available redacted versions of the same raw media file 504 have been processed via process 1400.

Block 1424 comprises aggregating and indexing all of the corrections that are catalogued at block 1412. Statistical correlations between corrections from different versions from block 1404 and block 4020 may be noted. Statistical outliers may be disregarded. The index thus averages all of the expected manual corrections into a baseline media file such that a range of acceptable versus unacceptable corrections for manual corrections can be determined for use at block 416. The index from block 1424 is then associated with the baseline redacted file 504-B as one of the expected performance metrics.

To elaborate, a "perfect" performance ranking at block 416 will result from zero differences between the comparative redacted media file 504-C and the baseline redacted file 504-B. However, using the index from block 1424, a number of errors in the comparative redacted media file 504-C can be established, such that the performance ranking from block 416 can be relative either to the baseline media file 504-B and by extension, relative performance rankings between different redaction agents 704 can be established by repeating process 400 for different redaction agents 704. The number of errors can be associated with a threshold, whereby passing the threshold determines that the comparative redacted media file 504-C is unacceptable in quality, whereas falling below the threshold determines that the comparative redacted media file 504-C is acceptable in quality. Thus, the number of errors and the associated threshold can become part of the baseline redacted file 504-B for use in determining performance rankings at block 416. The redacted media files from block 1404 and block 1420 may be generated by trusted redaction agents 704, albeit with an understanding that even amongst those agents 704 there may be subjective differences. A larger the number of versions from block 1420 can thus improve overall confidence in the acceptable correction rate in the index at block 1424.

In variations of process 1400, block 1404 can comprise making manual corrections at block 1408 or automated corrections at block 1408. Likewise, the redacted versions of the media files received at block 1404 or block 1420 can be manually generated redacted media files or automatically generated redacted media files. Thus process 1400 and system 100 can be used for testing and training individual redaction agents or for testing and training automated redaction algorithms via machine learning using the index of corrections from block 1424.

A person skilled in the art will now appreciate how process 1300 and process 1400 can be combined to associate baseline redacted file 504-B with a threshold level of acceptable number of errors and an expected time to complete the redactions, all of which can become expected performance metrics and form part of the performance rankings at block 416. A person of skill in the art will now also appreciate that the performance rankings from block 416 are expansive in definition.

Figure 15:
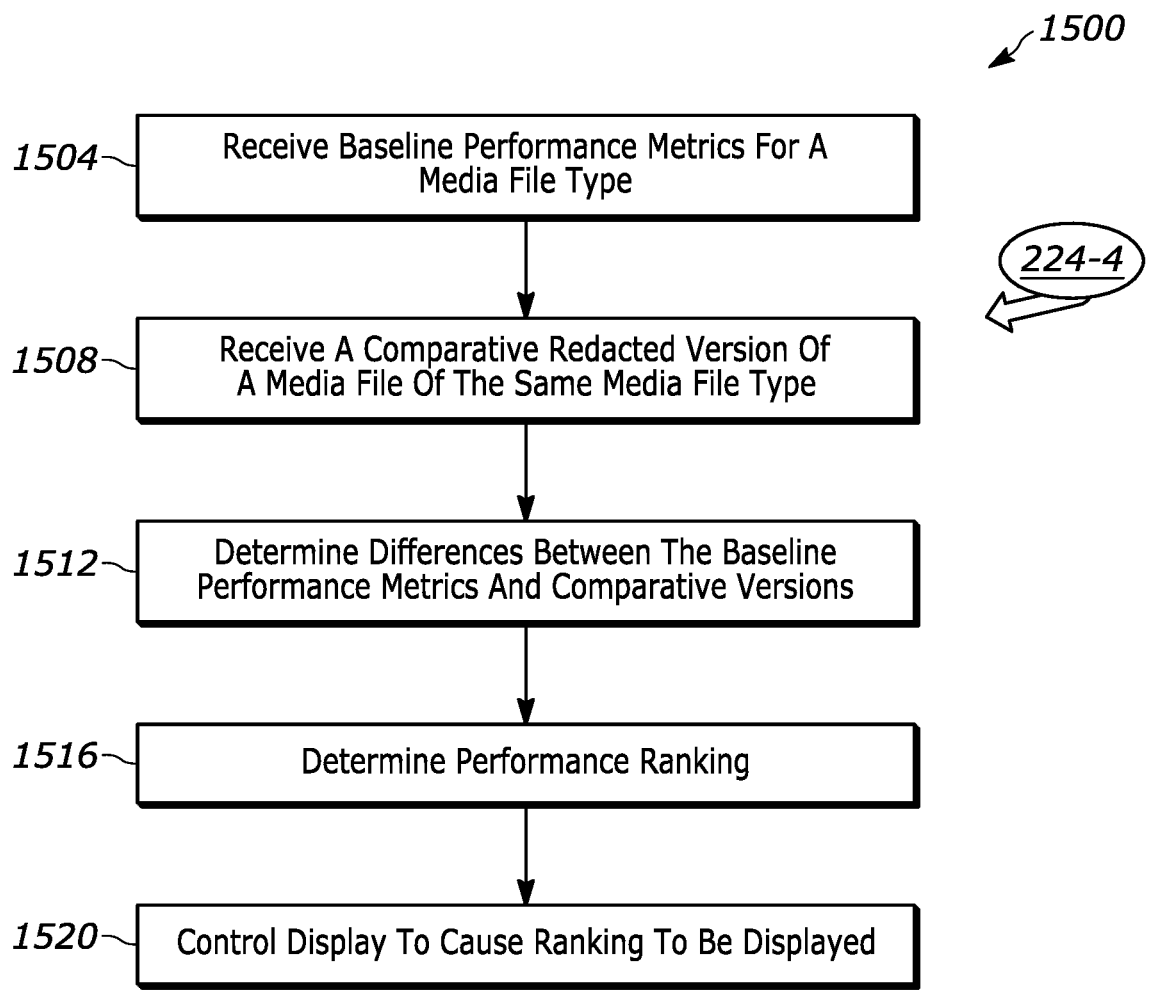
FIG. 15 is another flowchart depicting another process for monitoring and analyzing media redaction performance in accordance with an example embodiment.

In another variation, system 100 can be enhanced to include a series of comparisons between different raw media files 504 collected from different media source devices 124 at different times. Via manual process or machine learning, those comparisons can be used so that raw media files 504 can be classified into similar types. The taxonomy for types may be coarse and/or granular. Coarse taxonomy would include format, such as video, audio, text, language(s), location, duration and the like. More granular taxonomy can include an incident classification, such as car accident, robbery, public demonstration, traffic violation and the like. When a baseline redacted file 504-B has been established, the accompanying expected performance metrics can also be defined. (Recall such performance metrics may include expected duration of completion (from process 1300) and expected number and/or types of redactions.) Having established a process for classifying media files into certain types, baseline redacted file 504-B can also be associated with a particular type (i.e. file type and/or incident type). By extension, all future raw media files of the same type as baseline redacted media file 504-B may be assigned the same baseline performance metrics. Such raw media files of the same type can then be assigned a set of expected performance metrics that are the same as baseline redacted media file 504-B. FIG. 15 shows process 1500, which is a variation of process 400, that makes use of this approach. Block 1504 comprises receiving baseline performance metrics for a media file type. Block 1504 is analogous to block 404, but instead of receiving baseline redacted media file 504-B, only the baseline performance metrics for that type of baseline redacted media file 504-B are received. Block 1508 comprises receiving a comparative redacted version of a media file of the same media file type. Block 1508 is analogous to block 408, except that the comparative redacted version is of the same media file type as the media file type associated with the performance metrics received at block 1504. Block 1512 comprises determining the differences between the baseline performance metrics and the comparative version performance metrics. The comparative version performance metrics may include the number of corrections and the duration of time to complete the redacted version. Block 1512 is analogous to block 412, except that the differences are based on the actual performance metrics from block 1508. Block 1516 comprises determining the performance ranking. Block 1516 is essentially the same as block 416, except that block 1516 is based on the actual performance metrics from block 1508 according to the expected baseline performance metrics from block 1504. Block 1520 is essentially the same as block 1520 where a display is controlled to cause the display of the ranking. Various dashboards such as dashboard 1100 or dashboard 1200 or combinations thereof and/or variants thereon can be generated as part of block 1520.

In another variation, system 100 can be enhanced to include a series of comparisons between different raw media files 504 collected from different media source devices 124 at different times. Via manual process or machine learning, those different raw media files 504 can be classified and grouped into similar types. This variation is discussed elsewhere herein.

System 100 can be used to also evaluate the performance of automated redactions, by receiving a baseline redacted media file from a trusted redaction agent or group of redaction agents and receiving the comparative redacted media files from a machine implementing artificial intelligence, neural networks or other algorithms, and thereby evaluating the quality of the work that is being automatically generated. A person skilled in the art will recognize that the teaching herein can be part of an artificial intelligence feedback process to improve the automation of redactions.

System 100 and process 400 and process 1500 can be used to evaluate the performance of redaction agents, by providing comparative redacted versions of media files as generated by redaction agents at block 408. System 100 and process 400 and process 1500 can be also used to evaluate the performance of automatic redaction tools, by providing comparative redacted versions of media files as generated by such redaction tools at block 408. Process 400 and process 1500 can thus be part of a feedback loop for an artificial intelligence training exercise by feeding the results of block 412 back into the neural network to train the automatic redaction tool how to improve performance.

It will now be apparent that the foregoing improves overall memory, processing and communication resources in a redaction system. Overall quality of redaction performance can be measured using system 100, providing feedback to redaction agents and redaction agents supervisors to increase accuracy and decrease time spent managing workflow queues of redaction of raw media files. Increases in quality and decreases in time therefore reduce the need to "redo" redaction processes that are erroneous, which thereby reduces technological resource burdens on systems such as system 100. Further technological resource efficiency can be achieved with the automatic routing of training media files or live media files to the appropriate agent account. Indeed, in more complex variations of system 100, it is contemplated that certain agents 704 may show better aptitude for certain types of incidents, and that system 100 can help ascertain which agents 704 are so suited. For example, certain agents 704 may have better aptitude for redaction of video files, while other agents 704 may have better aptitude for redaction of audio files, while still others have better aptitude for text files. Block 416 of process 400 can be configured with finer grained algorithms for performance rankings to facilitate such improved routings, and thereby route different types of raw media files to an appropriate redaction agent account.

The present specification contemplates the use of machine learning or other tools to predict time to complete redaction based on past performance for the type of media files and other factors (such as number of objects in video/image), so priorities and the time of redaction agents can be utilized efficiently. The present specification also contemplates identifiable possible deficiencies in the automatic redaction algorithms or tools. KPIs for redactions analytics can be generated at the redaction agent, redaction agent supervisor, or agency level. KPIs can be tracked for each redaction agent for different types of media files, including identification of opportunities for additional training or accommodations when KPIs drop below certain thresholds for particular redaction agents or media file types.

The present specification thus provides an optimization system for managing key performance indicators (KPIs) of video redaction including: displaying dashboard with redaction performance and trends based on a selected view; suggesting processes to improve the performance, including adjustment or calibration of software or tools used to perform the redactions; assigning training for groups of redaction agents or individual redaction agents; selecting materials to redact for specific redaction agents depending on their skills; estimating the time to completion based on analysis of current progress and historical performance. Dashboard views can be created that are: across an entire agency of redaction agents, across groups of teams of redaction agents, across teams of redaction agents; tailored to redaction agents supervisors; or individual redaction agents.

The KPIs can be based on a number of factors including a number of times a redaction of an artifact has to be redone or removed, the length of time spent redacting a document type compared to previous redaction or how the redaction was actually performed.

As will now be apparent from this detailed description, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot control a display screen, cannot implement a machine learning algorithm, nor implement a machine learning algorithm feedback loop, and the like).

In the foregoing specification, specific embodiments have been described. However, one of ordinary skill in the art will now appreciate that various modifications and changes can be made without departing from the scope of the invention as set forth in the claims below. Accordingly, the specification and figures are to be regarded in illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The one or more machine-learning algorithms and/or deep learning algorithms and/or neural networks discussed herein may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms; reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like. To be clear, any suitable machine-learning algorithm and/or deep learning algorithm and/or neural network is within the scope of present specification.

Moreover in this document, relational terms such as first and second, top and bottom, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, process, article, or apparatus that comprises, has, includes, contains a list of elements does not include only those elements but may include other elements not expressly listed or inherent to such process, process, article, or apparatus. An element preceded by "comprises . . . a", "has . . . a", "includes . . . a", "contains . . . a" does not, without more constraints, preclude the existence of additional identical elements in the process, process, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. Furthermore, references to specific percentages should be construed as being "about" the specified percentage.

A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the process and/or system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the different approaches could be used.

Moreover, embodiments can be implemented as a computer-readable storage medium having computer readable code stored thereon for programming a computer (e.g., comprising a processor) to perform a process as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This process of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A metrics system for monitoring and analyzing media redaction performance, the metrics system comprising:
an electronic computing device including a processor configured to:
receive a baseline redacted version of a media file;
receive a comparative redacted version of the media file;
determine a set of differences between the baseline redacted version and the comparative redacted version;
determine a redaction agent account associated with the comparative redacted version;
determine a performance ranking based on the set of differences; and,
cause the performance ranking to be displayed,
wherein the performance ranking shows relative performance of the redaction agent account associated with the comparative redacted version in relation to at least one additional redaction agent account or at least one automatically redacted baseline redacted version that each generated different respective comparative redacted versions.

2. The metrics system of claim 1 wherein the processor is further configured to:
determine if the performance ranking meets a predetermined threshold;
allocate, to the redaction agent account, an unredacted media file; and,
display the unredacted media file in a workflow queue associated with the redaction agent account.

3. The metrics system of claim 1 wherein the processor is further configured to:
determine if the performance ranking falls below a predetermined threshold;
allocate, to the redaction agent account, an unredacted training version of a second media file associated with a second baseline redacted version of the second media file; and,
display the unredacted training version in a workflow queue of the redaction agent account for eventual determination of a further performance ranking.

4. The metrics system of claim 1 wherein the media file has content taken of a physical space having an expectation of privacy for individuals and the baseline redacted version has redacted personally identifiable information of the individuals.

5. The metrics system of claim 4 wherein the media file is a public safety incident occurring in the physical space.

6. The metrics system of claim 1 wherein the performance ranking is displayed in a different format if the ranking exceeds a predetermined threshold.

7. The metrics system of claim 1 wherein the performance ranking is a level of accuracy between the comparative redacted version and the baseline redacted version.

8. The metrics system of claim 1 wherein the performance ranking is a length of time taken to complete the comparative redacted version in relation to the baseline redacted version or an expected length of time to complete the comparative redacted version.

9. The metrics system of claim 1 wherein performance ranking includes individual types of rankings.

10. The metrics system of claim 1 wherein the individual types include at least one of accuracy and duration to complete.

11. The metrics system of claim 1 wherein a redaction can be at least one of removal or obfuscation of a portion video image; a removal or obfuscation of a portion of an audio file; and a removal or obfuscation of piece of text.

12. A method for monitoring and analyzing media redaction performance, comprising:
receiving, at a computer processor, a baseline redacted version of a media file;
receiving, at the computer processor, a comparative redacted version of the media file;
determining, at the computer processor, a set of differences between the baseline redacted version and the comparative redacted version;
determining, at the computer processor, a redaction agent account associated with the comparative redacted version;
determining, at the computer processor, a performance ranking based on the set of differences; and,
controlling, via the computer processor, a display device connected to the computer processor, to cause the performance ranking to be displayed, wherein the performance ranking shows relative performance of the redaction agent account associated with the comparative redacted version in relation to at least one additional redaction agent account or at least one automatically redacted baseline redacted version that each generated different respective comparative redacted versions.

13. The method of claim 12 further comprising:
determining, at the computer processor, if the performance ranking meets a predetermined threshold;
allocating, to the redaction agent account, an unredacted media file; and,
displaying the unredacted media file in a workflow queue associated with the redaction agent account.

14. The method of claim 12 further comprising:
determining if the performance ranking falls below a predetermined threshold;
allocating, to the redaction agent account, an unredacted training version of a second media file associated with a second baseline redacted version of the second media file; and,
displaying the unredacted training version in a workflow queue of the redaction agent account for eventual determination of a further performance ranking.

15. The method of claim 12 wherein the media file has content taken of a physical space having an expectation of privacy for individuals and the baseline redacted version has redacted personally identifiable information of the individuals.

16. The method of claim 15 wherein the media file is a public safety incident occurring in the physical space.

17. The method of claim 12 wherein the performance ranking is displayed in a different format if the ranking exceeds a predetermined threshold.

18. The method of claim 12 wherein the performance ranking is a level of accuracy between the comparative redacted version and the baseline redacted version.

19. The method of claim 12 wherein the performance ranking is a length of time taken to complete the comparative redacted version in relation to the baseline redacted version.

* * * * *